(12) United States Patent
Hunter

(10) Patent No.: US 11,278,799 B2
(45) Date of Patent: *Mar. 22, 2022

(54) METHODS AND SYSTEMS FOR SCHEDULING GAME PLAY OF A VIDEO GAME

(71) Applicant: Sony Interactive Entertainment LLC, San Mateo, CA (US)

(72) Inventor: Nicholas Robertson Hunter, San Francisco, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,932

(22) Filed: Mar. 10, 2020

(65) Prior Publication Data

US 2020/0206610 A1    Jul. 2, 2020

Related U.S. Application Data

(63) Continuation of application No. 15/715,001, filed on Sep. 25, 2017, now Pat. No. 10,610,779.

(Continued)

(51) Int. Cl.
*A63F 13/35*    (2014.01)
*A63F 13/79*    (2014.01)
(Continued)

(52) U.S. Cl.
CPC ............ *A63F 13/35* (2014.09); *A63F 13/352* (2014.09); *A63F 13/48* (2014.09); *A63F 13/73* (2014.09);
(Continued)

(58) Field of Classification Search
CPC ................ A63F 13/35; A63F 2300/556; A63F 2300/5573; A63F 13/216; A63F 13/352; A63F 13/48

See application file for complete search history.

(56) References Cited

U.S. PATENT DOCUMENTS 7,311,608 B1 * 12/2007 Danieli .................. A63F 13/12
463/42
7,647,560 B2    1/2010 Macauley et al.
(Continued)

FOREIGN PATENT DOCUMENTS

JP        2007215767 A    8/2007

*Primary Examiner* — Steve Rowland
(74) *Attorney, Agent, or Firm* — Penilla IP, APC

(57) ABSTRACT

Methods and systems for assigning a data center in a second geo location for migrating data in anticipation of receiving a request from a user account from the second geo location includes receiving an indication of a change in geo location of a user from a first geo location to the second geo location. Save data for the user is identified at the first geo location. The save data is analyzed to determine usage trend of the user for the plurality of games. A portion of the save data is identified, based on the usage trend, and transmitted to a second data center in the second geo location in anticipation of the user's likely access of the save data at the second geo location. The save data is made available to game logic of one or more games, when executed on a cloud gaming system, so as to provide current state of game play of the respective one or more games for rendering on a client device of the user used to access the game.

16 Claims, 8 Drawing Sheets

Related U.S. Application Data

(60) Provisional application No. 62/522,050, filed on Jun. 19, 2017.

(51) Int. Cl.

| | | |
|---|---|---|
| A63F 13/73 | (2014.01) | |
| H04L 67/1021 | (2022.01) | |
| H04L 67/1095 | (2022.01) | |
| H04L 67/5681 | (2022.01) | |
| A63F 13/87 | (2014.01) | |
| A63F 13/48 | (2014.01) | |
| H04L 67/62 | (2022.01) | |
| A63F 13/352 | (2014.01) | |
| H04L 67/61 | (2022.01) | |
| A63F 13/795 | (2014.01) | |
| H04L 67/306 | (2022.01) | |
| H04L 67/10 | (2022.01) | |
| H04L 67/55 | (2022.01) | |
| H04L 67/54 | (2022.01) | |
| A63F 13/493 | (2014.01) | |
| A63F 13/355 | (2014.01) | |
| A63F 13/49 | (2014.01) | |

(52) U.S. Cl.
CPC ............ *A63F 13/79* (2014.09); *A63F 13/795* (2014.09); *A63F 13/87* (2014.09); *H04L 67/10* (2013.01); *H04L 67/1021* (2013.01); *H04L 67/1095* (2013.01); *H04L 67/26* (2013.01); *H04L 67/2847* (2013.01); *H04L 67/306* (2013.01); *H04L 67/322* (2013.01); *H04L 67/325* (2013.01); *A63F 13/355* (2014.09); *A63F 13/49* (2014.09); *A63F 13/493* (2014.09); *H04L 67/24* (2013.01)

(56) References Cited

U.S. PATENT DOCUMENTS

| | | | |
|---|---|---|---|
| 2003/0125112 A1* | 7/2003 | Silvester | A63F 13/48 463/42 |
| 2006/0089194 A1* | 4/2006 | Joshi | G07F 17/3255 463/25 |
| 2009/0075737 A1 | 3/2009 | Harris | |
| 2010/0306672 A1* | 12/2010 | McEniry | H04F 67/38 715/753 |
| 2010/0319062 A1* | 12/2010 | Danieli | H04L 63/08 726/7 |
| 2011/0252079 A1* | 10/2011 | Werner | H04L 61/2567 709/202 |
| 2013/0012293 A1* | 1/2013 | Walker | G07F 17/3269 463/20 |
| 2013/0254680 A1* | 9/2013 | Buhr | G06Q 50/01 715/753 |
| 2014/0024457 A1* | 1/2014 | Justice | A63F 13/792 463/42 |
| 2016/0001186 A1* | 1/2016 | Marr | A63F 13/30 463/40 |
| 2017/0354877 A1* | 12/2017 | Harry | A63F 13/34 |

* cited by examiner

METHODS AND SYSTEMS FOR SCHEDULING GAME PLAY OF A VIDEO GAME

CLAIM OF PRIORITY

The present application is a continuation of and claims priority to and benefit of the commonly owned U.S. application Ser. No. 15/715,001, filed on Sep. 25, 2017, entitled "Methods and Systems for Scheduling Game Play of a Video Game," which claims priority to and the benefit of the commonly owned, provisional patent application No. 62/522,050 filed on Jun. 19, 2017, and entitled "Methods and Systems for Scheduling Game Play of a Video Game," which are incorporated herein by reference in their entireties.

FIELD

The present disclosure is related to interactive applications executing on a cloud system, and specifically to video games or gaming applications executing on a cloud gaming system. More specifically, the present disclosure describes methods and system for enabling a group of players to assemble online at a scheduled time for playing a video game, based on a request from a player in the group.

BACKGROUND

Description of the Related Art

Video gaming has become increasingly more popular with the advancement of video game technology. And with the advancement in cloud based processing, such as high powered graphics processors, users are presented with an interactive experience that is desirable and optimal. For example, cloud-based systems provide unlimited processing power and system resources for execution of interactive applications, such as video games, and an overwhelming breadth of legacy and new video games available to users, making it possible for users to access and play the video games without having to upgrade their own devices. These cloud-based systems enable streaming of content to remote clients, wherein most processing is done on servers, which may be distributed. Cloud-based gaming, therefore, has been increasing in popularity because users find it easier to access more video game titles without complex hardware restrictions, and game suppliers find it easier to manage game code from centralized locations.

A user may select a video game for game play and the selected video game is executed on a remote server and information associated with the game play is presented to the user over one or multiple devices. Similarly, the user may select one or multiple devices to provide game play interactions and such interactions are processed by the remote server to advance the game play of the selected video game or to enhance the user experience during the game play.

Some of the video games are configured to be played by a single player while some other video games are configured to be played by multiple players. In a multi-player game, friends (e.g., social contacts or game play contacts) of a user can participate in the game play along with the user by viewing information and providing interactions using one of the associated multiple devices during game play of the video game.

It is in this context that embodiments of the disclosure arise.

SUMMARY OF THE INVENTION

Embodiments of the present invention disclose methods and systems that are used for providing instant access to a game hosted by a cloud hosting system to allow the players to begin game play of the game, from any geo location. The cloud hosting system is configured to host a plurality of online, interactive applications for user interactions (e.g., video game applications and other interactive applications), using resources available to the cloud hosting system. In instances where the cloud hosting system hosts game applications, the cloud hosting system is also referred to herein as a "cloud gaming system". The video games (or simply "games") that are hosted by the cloud gaming system may include single-player games and multi-player games.

Broadly speaking, a user accesses the cloud gaming system and initiates a request to play a game with one or more players. The request includes a scheduled time when the user wishes to play the game and identifies the players that he wants to join in the game play. The scheduled time is a time that is somewhere in the future and could be immediately after the request has been initiated, a few minutes after the request has been initiated or some other time or date in the future. The cloud gaming system processes the request by sending a notification to the players identified in the request informing the players that the user wishes to play the video game at the scheduled time. Responses received from the players are examined to determine which players are interested to play the game with the user at the scheduled time. Depending on one or more players responding favorably to play the game at the scheduled time, the cloud gaming system pre-loads the game in advance so as to make the game available for game play at the scheduled time. As part of processing the request, the cloud gaming system determines a current geo location of the user and each of the players that agreed to play the game with the user. The cloud gaming system then performs latency and other quality related tests to identify data center(s) that is in the vicinity of the geo location(s) for each of the players and the user. The cloud gaming system sends a signal to the identified data center(s) to make the game available for game play at the scheduled time. A server at the data center(s) in the geo location(s) processes the signal by loading the game code of the video game and updates the game play to a point where game play is to begin, in advance to enable the user and the players to access the game and begin game play, at the scheduled time.

Interactions provided by the user and the players during game play are used to update a current game state of the game at the different data centers. The game related interactions are also maintained at the respective data center(s) as game data. The current game state of the game includes current game level, current status of the game for each player and the user including game winnings, trophies, game points, game currencies, weapons, freebies, awards, rewards, point scores, game lives, etc., game customizations, available game play options, game metrics, game clips, mini-games created from the game play, historical communication with other players, game recordings, and any other game-related or player-related attributes. The current game state of the game allows the cloud gaming system to re-create the game play for the game for the user and the players for any subsequent game play.

Pre-loading the game at the cloud gaming system and getting the game ready for game play just prior to a scheduled time selected by a user enables the user and the players to access and begin game play of the game instantaneously without having to go through any set-up routines. Such timely pre-loading of the game prior to the scheduled time ensures that the cloud gaming system provides the system and network resources for the video game when needed, and avoids locking up of the system resources unnecessarily, when not needed. The embodiments described herein enable the user to bring together a group of players for game play at any scheduled time, so that when the user and the players access the game for game play, they are directly "dropped-in" to a stream of game play of the game. Dropping-in, as used in this application, refers to the user and the players having access to game play of the game from a point where the game is to be started, making it appear as though the user and the players never left the game. It should be noted that a player, as referenced herein, includes a friend or a social contact or a game-related contact or any other user that is related or unrelated to the user. Bringing together the players for game play is akin to a "Flash Mob" concept, wherein a user brings together people to perform an activity for an event.

In one implementation, a method is provided. The method includes receiving a request for game play of a video game. The request originates from a client device of a first player and identifies a scheduled time for game play and identities of other players that are to be invited to join in game play of the video game. In response to the request, a notification is sent to the other players requesting the other players to join in game play of the video game at the scheduled time. Responses received for the notification from the other players are evaluated to identify specific ones of the other players that have agreed for game play of the video game at the scheduled time. Based on the evaluation, the video game is pre-loaded up to a point from where game play of the video game is to begin, for the first player and the specific ones of the other players who have agreed to game play. The pre-loading of the video game is performed in advance to enable the first player and each of the specific ones of the other players to begin game play of the video game by accessing the video game at the scheduled time. The video game is a multi-player video game.

In another implementation, a method for game play of a video game available on a cloud gaming system, is provided. The method includes detecting a request for game play of a video game received from a first player. The request identifies a scheduled time for game play and identities of other players who are to be invited to join in game play of the video game. The other players are users that are currently online interacting with other applications and are identified from a social network of the first player. In response to the request, a notification is sent to the other players that are online requesting the other players to join in game play of the video game at the scheduled time. Responses received from one or more of the other players that were sent the notification are evaluated to identify specific ones of the other players that have agreed for game play of the video game at the scheduled time. The video game is pre-loaded for the first player and the specific ones of the other players who have agreed for game play at the schedule time, the pre-loading is done up to a point from where game play of the video game is to begin. The pre-loading of the video game is performed in advance to enable the first player and each of the specific ones of the other players to instantaneously begin game play of the video game by accessing the video game at the scheduled time. The video game is a multi-player video game.

In yet another implementation, a method for game play of a video game available on a cloud gaming system, is disclosed. The method includes detecting a request for game play of the video game from a first player. The request identifies a scheduled time for joining game play of the video game that other players are currently engaged in the game play. A notification is sent to the other players that are currently playing the video game requesting to join in game play of the video game at a scheduled time. Responses to the notification received from one or more of the other players are evaluated to identify specific ones of the other players that have agreed to allow the first player to join in the game play of the video game at the scheduled time. The video game is pre-loaded up to a current game state, for the first player while the specific ones of the other players continue with game play of the video game. The pre-loading is performed in time to enable the first player to instantaneously join in game play of the video game from the current game state, at the scheduled time.

In another implementation, a cloud gaming system is disclosed. The cloud gaming system includes an application server that is configured to execute a plurality of games hosted by the cloud gaming system and to service a request for game play of a game at a scheduled time, wherein the request is originated from a client device of a first player. The application server includes a game play scheduler. The game play scheduler is configured to receive the request, analyze the request to identify the game identifier of the game for which game play is requested and identity of the players to invite for game play. A data center manager within the game play scheduler is configured to process the request by identifying a geo location for each player (including a first player that initiated the request), identify a data center in a vicinity of the geo location of the player, and generate a signal to the identified data center with a request to instantiate the game on one or more servers within the identified data center. A game data synchronizer within the game play scheduler is configured to synchronize pre-loading game data of the game on one or more servers within the identified data center for each player and make the game available for game play from a point where the prior game play was left off. The game data synchronizer may interact with schedule window to identify a time window for pre-loading the game and with an app scheduler to identify game data of each player that needs to be uploaded. The game play scheduler is further configured to detect each player that accepted the invitation for game play at the scheduled time, connecting to the cloud gaming system and provide access to the game for game play from a point where the game was paused. The game play scheduler is configured to exchange game data during game play with respective client devices and update game state of the game on the server and at the respective client devices.

Other aspects and advantages of the invention will become apparent for one skilled in the art from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Figure 1:
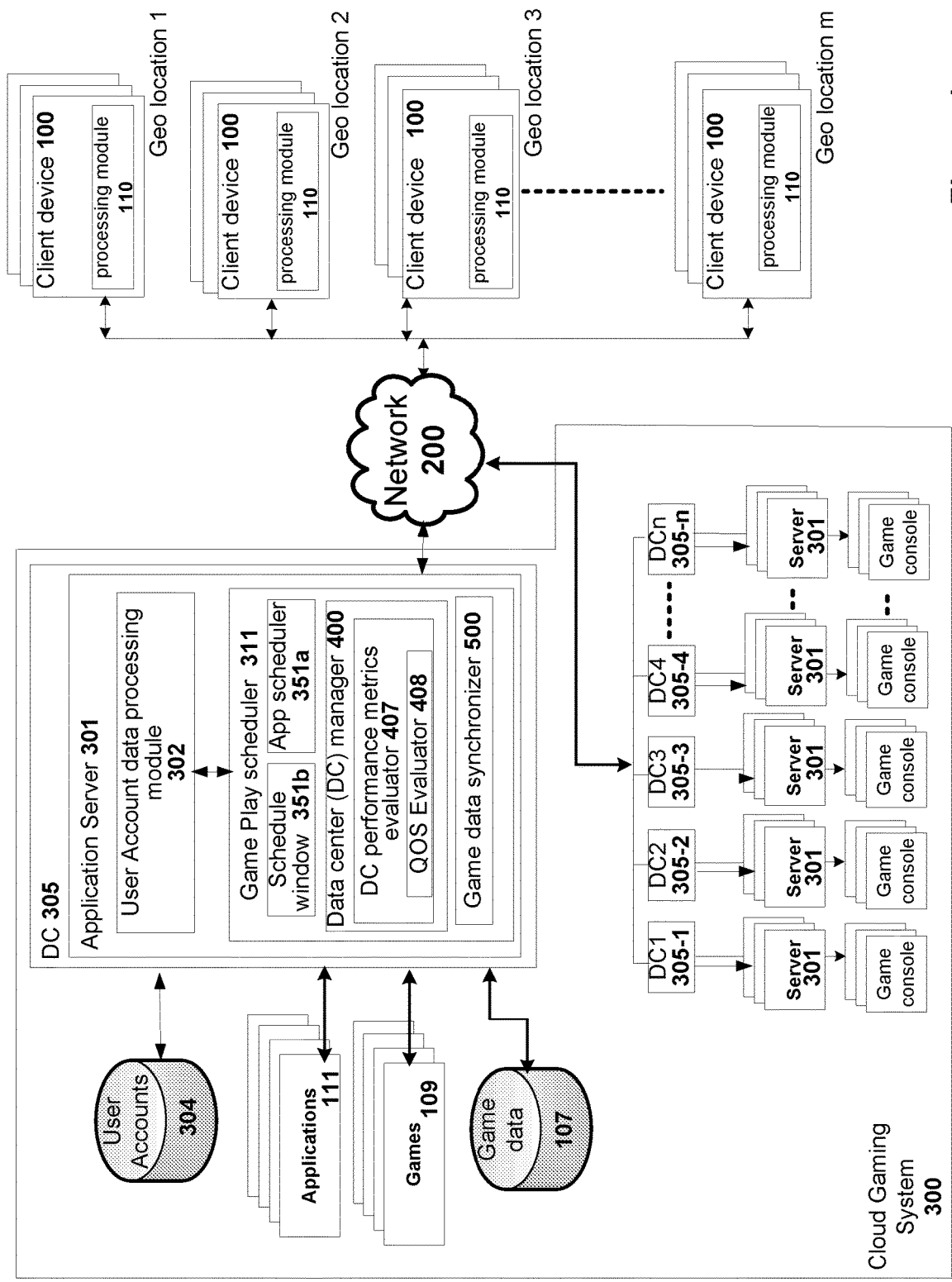
FIG. 1 illustrates a simplified block diagram of an example system that is used to detect change in geo location of a user in order to migrate save data of the user to a data center at a second geo location, in accordance with an implementation of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various implementations of the present invention a user accesses a cloud gaming system through a user account and selects a game. The request includes a time that the user schedules for game play and identity of players that the user wishes to invite for game play of the game. The cloud gaming system detects the request originating from a client device of the user and, in response, sends a notification to other players to join in game play of the game at the time scheduled by the user. The other players' responses to the notification are evaluated to determine which ones of the other players have expressed interest in the game play of the game for the scheduled time. Based on the evaluation, the cloud gaming system pre-loads the game in specific data centers associated with the cloud gaming system to enable the user and the other players to game play the game upon accessing the game at the cloud gaming system. The loading of the game is done in advance to enable the user and other players to access and begin playing the game.

Performing the pre-loading of the game just in time for game play of the game at the scheduled time, enables the cloud gaming system to wisely allocate the network and system resources for a period of time when such resources are needed and to not unnecessarily tie up the resources for remaining period of time when the user and the other players are not going to be accessing the cloud gaming system for playing the game. Further, getting the game ready for game play at a scheduled time allows the user and the other players to directly "drop-in" to the game stream without requiring the user and the other players to go through the set-up routines. Other advantages of the various implementations described herein will become apparent to one skilled in the art.

The cloud gaming system may query user profile of the user and of the other players or use signals generated from the user and the other players' client devices to determine current geo location of the user and the other players. One or more data centers in the vicinity of the current geo location of the user and the other players are identified. The servers in the data center are evaluated to determine if the servers have sufficient processing and communication resources required for game play of the game. For example, the servers in the data centers may be evaluated based on the available communication protocols, available system resources, connection speeds (i.e., streaming speeds), etc., and specific ones of the servers may be identified to upload the game code and game data just prior to the scheduled time. Timely uploading of the game data allows client devices associated with the user and the other players who have agreed to play the game to connect to the cloud gaming system and instantaneously begin game play of the game at the scheduled time.

During game play, system resources at the identified data centers and connection attributes of the connection between corresponding client devices and the servers of specific ones of identified data centers are monitored to ensure that the connection attributes meet the connection requirements for game play of the game. Periodic quality-of-service tests are conducted to ensure that sufficient system resources are available during game play of the game. The user and the other players may be accessing the game from a single server of a data center. Alternately, the user and the other players may be accessing the game from a plurality of servers in a single data center or in a plurality of data centers. As a result, the server(s) within the identified data center(s) may be verified to ensure that the server(s) are capable of providing resources to enable the user and the other players to have a satisfactory game play experience.

The game data for the game may include game-related data and user-related data. The game-related data and/or user-related data may include game code and game state information that is sufficient to re-create the game up to a point (e.g., current game state recorded for the game) from where the user is interested in resuming game play of the game. The re-creation of the game allows the user and the other players that responded to the game play request to resume game play from the point onward, and get totally immersed in the game play of the game.

Monitoring system resources and connection attributes may include monitoring one or more of connection speed of the communication connection established between the respective client device of the user or other player and the corresponding server of the data center that is used to provide game data for the player (i.e., user or other player), communication protocol used, communication and system resource availability at the server and at the data center, anticipated communication and system resource demand at the scheduled time, etc. The monitoring of the communication connection may be performed by exchanging streaming data packets between the respective client device and the corresponding data center before or after allocation and evaluating the exchange. Such monitoring at the scheduled time and during game play is to ensure that the quality of service does not deteriorate during game play. If the resource or connection attributes fall short of the expected connection requirements, then additional resources may be allocated within the assigned server, or the server within the data center may be switched to another server or the data center may be switched to another data center within the same geo location so as to provide optimal gaming experience for the user.

Execution of the game code and the loading of the game data at one or more servers within one or more data centers are synchronized so that the user and the other players are presented with current game data with minimal to no latency. Data generated during game play are used to affect the game state of the game and are stored in a game data datastore as game data. The game data is used to update profile of the assigned data center(s) and user metrics within the user profile of the user and the other players, and includes sufficient details to re-create the game as and when needed. The data center profile may be used to determine current status of the resources in the respective data center(s). For example, the data center profile identifies the connection attributes that are available, connection attributes that were used when the request from the user was serviced, system resources available and system resources that were consumed during servicing of the request for game play. The data center profile is used to ensure that the identified data center has sufficient resources and that the connection attributes of the connection between the data center and corresponding client device(s) is able to meet the connection requirements for streaming the graphics of the game during the scheduled time, so as to avoid any latency during transmission of the game play data to the client devices of the user and the other players.

The cloud gaming system provides ways to get a large number of people to get together online to play the same content at the same time. The cloud gaming system allows an organizer (i.e., a user or first player) to schedule a time for a game play event of a game. In response, the cloud gaming system sends a notification to players identified by the organizer. One or more servers are used to pre-load the game so that the organizer the players can connect to the game instantaneously as soon as they access the cloud gaming system. The pre-loading allows the players that opt-in to the request to get immediately dropped into a stream of game play. The cloud gaming system provides a combination of a game streaming service and a push notification service that work hand-in-hand to bring the user and players together to perform an event at a scheduled time.

The various implementations that will be described herein allow a cloud gaming system to allocate system and communication resources smartly at a time scheduled by a user so that the user and players of a video game may be able to directly "drop-in" to the game and begin game play. The user schedules or programs a time for an event, such as a game play event, and the servers use the available resources to pre-load the game so that the players and the user can connect immediately and begin game play. The user may schedule the game play event on a periodic basis (e.g., once a day, once a week, etc.), or may schedule at random times. The various implementations allow a group of people to gather online at a scheduled time for performing an event, such as game play of a game application, and the cloud gaming system allocates the resources in a timely manner for performing the event at the scheduled time. With the general understanding of the invention, specific implementations will now be described with reference to the various drawings.

FIG. 1 illustrates a simplified block diagram of a system used for detecting a request for interacting with an application, such as game play of a game application, at a scheduled time. The request is received from a client device 100 of a first player. The client device 100 of the first player may be associated with geo location 1, for example. The client device 100 is communicatively connected to a server, such as an application server 301, on a cloud gaming system 300, over a network 200, such as the Internet. The server may be part of a data center that includes a plurality of servers, game consoles, etc.

The client device 100 is any computing device that includes a processing module (i.e., processor) 110, a memory and network connections to connect to a network and appropriate application programming interfaces (APIs) to communicate with a server-side application. The processor is capable of executing a client-side application that may run stand-alone or may interact with a server-side application by connecting to the network 200 through the network connections and use APIs to communicate with or access the server-side application. The network connection can be a wired or wireless connection. The client device 100 may be a thin client, a general purpose computer, a special purpose computer, a game console, a personal computer, a lap top computer, a tablet computing device, a mobile computing device, a portable gaming device, a cellular phone, a smartphone, a set-top box, a streaming media interface/device, a smart television or networked display, or any other computing device that can be used to access an application available locally or on a remote server of the cloud gaming system. The network connections and communication protocol used enable the client device 100 to communicate with the remote servers to receive content, including receiving a stream of video frames of multimedia content, from the remote servers, such as application servers 301 that are part of the cloud gaming system 300. The video frames streamed by the remote servers have undergone compression using an encoder. The client device 100 may include a decoder to decompress the stream of video frames representing game play content transmitted by the remote servers, and render images on a display screen of the client device 100. The rendered images identify current game state of a game.

The current game state of a game is substantially maintained and executed on the remote servers, with the client device 100 primarily functioning to receive, decode, render audio/video data from the game server or other application servers, and communicate user inputs back to the game server or other application servers. The client device 100 may be a standalone computing device that is connected to a display device to provide video data for rendering on the display device. In other implementations, the display device can be integrated into the client device 100. In one implementation, the client device is a display device that is a networked display device providing a platform operating system for applications or "apps" utilizing the network connectivity of the display device. In such an implementation, the client device 100 can be defined by an application executed on the platform provided by the display device's operating system.

An application server 301 as used in this application is a local server, a virtual computer, a cloud gaming server, a digital media server, a server that is used to provide a storefront of a game developer/game sponsor, a webserver, a terminal server, a console server, a remote server, or any other type or form of server computing device available in a data center 305 that is capable of hosting one or more interactive applications, (e.g., game application) including providing or allocating processing resources for executing the interactive application that users can access and interact during use. The application server 301 may include an encoder to compress the data in the video frames and forward the compressed video frames in a data stream to the client device 100 using application programming interface (API) calls that follow specific type of communication protocol.

For example, an application server 301, in the form of cloud gaming server, in a data center 305 executes the various video games that are available for a user account, defines the game states of various video games from moment to moment based on user interactions provided during game play, and sends video data (including image data, audio data, haptic data, etc.) to one or more client devices 100 distributed within a particular geo location or across a plurality of geo locations. The client devices 100 at given geo location(s) receive and process input from the user(s) playing the video game(s), and transmit the processed input data to the cloud gaming server, which performs additional processing to affect the game state of the one or more video games. The cloud-based gaming facilitates multi-player gaming for players located in different geo locations by providing instances of a video game for execution at one or more remote cloud gaming servers that is accessible by all players over the network 200. In this manner, execution of the video game is not dependent on any single player's hardware or network conductivity, though such may affect the user experience for that given player.

The operations performed using cloud gaming architecture described herein form technical operations requiring multiple servers and/or execution platforms to enable quick access to databases and presentation of content, such as game play content, to remotely located client devices 100 of users. The cloud gaming servers also perform compression operation on the game data prior to transmitting the same to the client device(s), by utilizing any number of compression techniques. The compression techniques may use standard encoders, which would then allow the standard decoders on client devices 100 to access, decode and render the image, video and audio data on the client devices 100 to enable game play of the video games. The management of the execution of the video games and distribution of game data to a plurality of client devices can involve a number of data centers (350-1 through 305-*n*), direction servers, quality-of-service testers or engines, direction and redirection to lower latency data centers, etc. These operations and tasks may utilize special purpose server computers that are designed for streaming and low latency while executing the games remotely and delivering data to the client devices 100 distributed across a wide geography.

A data center 305, in one implementation, includes a plurality of servers (e.g., gaming servers) 301, game consoles 301*a*, storage systems that are capable of storing game codes (109), application codes (111), user-related data (304) and application-related game data (107) and making them readily available to enable handling of varied requests from a plurality of users. It should be noted that users and players are used interchangeably in this application to refer to persons who access an interactive application, such as a game application, for viewing prior game play of the user, current or prior game play of another user, or for providing inputs to affect an outcome of the game application. The data center may also include telecommunication equipment, such as routers, switches, etc., to establish communication connection between the various client devices and the plurality of servers. Each of the plurality of servers may be equipped with server-side APIs (either distinct or similar) to communicate with the corresponding client-side API at a client device 100 or with server-side APIs associated with third party social media or content providers. In some implementations, the servers in the data center may be configured to execute various types of applications, including gaming applications, etc., and stream the application content to corresponding client devices 100 for rendering. The servers may be configured to perform operations of compression on any data generated or provided by the servers using any number of compression techniques and forward the compressed data to the client devices using any one of the communication and/or transmission protocols.

The servers may include terminal servers, console servers, virtual servers, etc., that are typically used to perform or execute specific functions, games or applications. Some examples of functions, games or applications performed by the servers may include database management, file management, mail service, print service, audio service, video service, web service, game management, application management, media management, catalog service, communications management, computing service, and proxy management, to name a few. In some implementations, a plurality of servers and/or storage devices may be provided as rack-mounted servers or storage devices, with each data center containing rows of server and/or storage racks. Each server may be capable of executing a plurality of applications and/or provide a wide range of services.

A request for game play of a video game at a scheduled time is received from a client device 100 at a hosting system, such as a cloud gaming system 300. The request for game play includes a game identifier of the video game and identity of one or more players that are invited to play the game. A server, such as Application server 301 receives the request and engages a user account data processing engine 302 to obtain user-related information to authenticate a user that initiated the request at the client device 100. The user account data processing engine 302 is configured to query a user accounts database 304 and receive user profile and user account information. The user accounts database 304 stores user profile and other user account information of a plurality of users of the cloud gaming system 300. The user profile and user account information are used to authenticate the user and the request initiated by the user. Upon successful authentication of the request, the request is forwarded to the game play scheduler 311 for servicing.

As part of authenticating the user, the user account data processing engine 302 of the Application server 301 queries the user account database 304 to determine all the games and/or applications the user owns, all the games and/or applications that are available for free, and uses this information to verify that the game identified in the request is one of the games that the user is authorized to interact with. If the game identified in the request is not one of the games that the user is authorized to interact with, the user account data processing engine 302 at the gaming server (i.e., application server 301) generates an error or warning message and forwards the warning message to the client device 100 for rendering. If the game identified in the request is one of the games the user is authorized to interact with, the user account data processing engine 302 forwards the request to the game play scheduler 311 for servicing the request.

As part of authenticating the request, the user account data processing engine 302 queries the user accounts database 304 to obtain user profile and user account information of the players identified in the request and use this information to ensure that each of the players identified in the request are authorized to access and play the game. The players may be social contacts of the user and may be identified from social network or other contact lists or may be contacts developed during game play of the video game or other video games or during interaction with other applications hosted by the cloud gaming system. The information provided in the user profile and user account, for example, includes contact information, a list of games and applications that each player can or has access, user credentials, user skills, user preferences, log-in routines used for setting up the game or application, etc. Based on the information in the user profile, it may be determined that one or more of the players identified in the request do not have authorization to play the game. In such a case, the invitation included in the request may include a signal to the cloud gaming system to provide access to the game for game play to the one or more players for one time to allow these players to sample the game. Upon verification, the user account data processing engine 302 forwards the retrieved user profile and user account information of the players to the game play scheduler 311.

The game play scheduler 311 uses the contact information of the players to send a notification to each of the players identified in the request. An app scheduler 351a within the game play scheduler 311 may be used to send the notification to each of the players identified in the request. The notification, in one implementation, may include the identifier of the user initiating the request for game play of the game, a scheduled time specified by the user for game play, the game identifier of the game, identifier of the player to which the notification is to be sent, and other pertinent information of the video game selected for game play. In some implementations, the notification to each player may also indicate identifier of other players that have been invited by the user for game play of the game.

In response to the notification, one or more of the players may accept the invitation for game play. The response received from each player is evaluated by the app scheduler 351a to determine which ones of the players accepted the invitation to play of the video game at the scheduled time and which ones declined the invitation. The response may include an authorization or may act as an authorization for the cloud gaming system to set up the game for game play session, for the scheduled time. The app scheduler 351a may, in one implementation, provide the details of the players that accepted the invitation to the first player that initiated the request.

The app scheduler 351a may interact with the user account data processing engine 302 to obtain user profile information of each player that accepted the invitation for game play. The user profile information of each player includes a geo location indicator that identifies a geo location of the player. In some implementations, the geo location of a player may be verified against a signal from a global positioning system (GPS) available within a client device 100 that was used by the player to respond to the invitation, for example. Alternately, the geo location of the player included in the geo location indicator may be verified against online activity detected from the player, such as web browsing activity, social media activity, or any other online activity of the player that can be used to identify a current geo location of the player. In one implementation, the game play scheduler 311 may engage a schedule window 351b to identify a time window before the scheduled time specified by the user for game play, and verify the geo location of the player at the start of the time window using signals from GPS of the client device 100 or from the player's online activity. The game play scheduler 311 provides the current geo location of each player to the data center (DC) manager 400.

For each player, the DC manager 400 uses the player's current geo location to identify a data center that is in the vicinity of the geo location of the player. If more than one data center is identified in the vicinity of the geo location of the player, the DC manager 400 evaluates the performance metrics of the different data centers to determine which data center is best suited to provide the resources for game play of the game in accordance to the requirements of the game so that the player can have a satisfying game play experience. The DC manager 400 may engage a DC performance metrics evaluator 407 to evaluate the data centers. Even if only one data center is identified in the vicinity of the geo location of the player, the data center is evaluated to see if one or more servers in the data center are capable of providing the resources for effectuating game play of the game. The DC performance metrics evaluator 407 identifies the DC performance metrics of the data center, which includes the types of resources available on each server, the demand placed on the resources at different periods of time, the capability of each server, capability of other resources, etc., to determine if the data center is capable of servicing the request of the user (i.e., first player) for game play of the game at the scheduled time. A quality-of-service (QOS) evaluator 408 is used to determine that the resources available for game play of the game are capable of providing a satisfactory game play experience for a player.

Based on the evaluation, a data center is identified at the geo location to service the game play request for each player. One or more servers in the data center are then used to execute an instance of the game. In one implementation, the instance of the game is executed in advance of the player connecting to the cloud gaming system to begin game play of the game with the user at the scheduled time. Once the game play session is initiated, the QoS evaluator 408 constantly or periodically monitors the resources (system and communication) to ensure that the quality of the game play has not deteriorated. If it is determined that the resources of the server(s) in the identified data center are tied up by other applications or are not performing at a level required by the game, the QoS evaluator 408 generates a signal to the DC performance metrics evaluator 407 to indicate the resource issue at the server(s). The DC performance metrics evaluator 407, in response to the signal from the QoS evaluator 408, may evaluate other servers within the data center or other data centers in the vicinity of the geo location to identify a different server or a different data center to service the request for game play and provide the server or the data center identifier to the app scheduler 351a.

The app scheduler 351a may interact with the game data synchronizer 500 to determine a game state of the video game. The game data synchronizer 500 queries the game data datastore 107 to obtain the game state of the video game. The game state of the video game is analyzed to identify game status for each player identified in the request and for the user that initiated the request. It should be noted that the game data datastore 107 maintains game state of a plurality of games that are available at the cloud gaming system 300 and may include multiple instances of game play of each game, wherein each instance of a game may identify specific ones of the players that played the game. If the game was played previously by the user and the players identified in the request, the current request may be to resume game play of the game from a point where the game was paused in the prior game play session. Consequently, the game state of the game identifies the game status of each player that played the game, wherein the game status of each player is based on the respective player's performance during prior game play of the game. Further, the game status of each player may provide information to determine game play credentials of the player, game skills of the player, etc., game icons used or customized for the game by the player, set of routines used during set up of the game, inputs provided during game play of the game, game winnings and game levels accomplished by the player, game preferences, etc. The information provided in the game status of each player is sufficient to re-create the respective player's game play of the game up to a point where the game was paused during prior game play.

Alternately, the game may not have been played by the user at all or may not be played with any of the players identified in the request. Obviously, in such case, the game data datastore 107 may not have any record of game play for the game that involves the user or the players identified in the request. As a result, the request may be to start the game from the beginning. In such a case, the game data synchronizer 500 may be used to upload the game data to enable the players and the user to start game play from the beginning of the game. In the case where the user has played the game before with other players but not with any of the players identified in the request, the game data synchronizer 500 may query game data datastore 107 for a history of game play of the game for the user and use information from the history to identify game play credentials of the user and type of customizations provided by the user during game play of the game with other players. Similarly, the game data synchronizer 500 may query game data datastore 107 for a history of game play of a plurality of games played by each player in the cloud gaming system to identify the game play credentials of the player and/or type of customizations generally provided by the player for the different games. The identified credentials, game preferences and game customizations of the user and each of the players are used in setting up the game for game play. In some implementations, the game data synchronizer 500 may analyze the preferences and types of customizations of a plurality of games played by each player to identify specific ones of the customizations and/or preferences that are common or are relevant or are compatible for the current game and apply those when setting up the game for that player. The historical game play information of each player is used to provide game play customizations during setting up of the game for game play at the scheduled time for the identified players and the user who have not played the game.

The game data synchronizer 500 uses the game status information or historical game play information obtained for the user and for each of the players to setup the game for game play. The game data synchronizer 500 instantiates the game at the one or more servers in one or more data centers identified by the DC manager 400. The instantiation of the game includes identifying the set-up routines followed by each of the players and the user (e.g., login routine, customization routine, etc.) during set up of prior game plays, and inputs (if any) provided by the user and each player for each of the routines during set up and during prior game play of the game. The game data synchronizer 500 then executes the game code of the game for each player, user, and automatically provides inputs to each of the routines initiated during initial set up and during game play of the game, wherein the inputs mimic the inputs provided by each player, the user, during set up routines and during game play of the game. The execution of the game is synchronized for the user and all players identified in the request.

In one implementation, the game data synchronizer 500 uses the time window identified by the schedule window 351*b* to begin setting up the game for game play at the one or more servers in one or more data centers so that the game is ready for the select ones of the players and the user to begin game play at the scheduled time. It should be noted that a user, as used in this application, is a person (i.e., first player) that initiates a game play request for a game at a scheduled time and the players are people (social contacts, game play contacts, etc.) that the user has invited to join game play. Separate references to the user and player are being made just to provide a clear demarcation of the role of each person in the game play, whereas in reality the user is also a player of the game and is sometimes referred to as a first player. It should be noted that the players identified in the request may have been the players that joined the user during prior game play of the game or may be identified to start a new game play session.

When a notification is sent to the players to join the user for game play of the game at the scheduled time, not all of the players from the prior game play may accept the invitation to join the game play at the scheduled time. The game is re-created up to a point where the game was paused in the prior game play (if any exists) between the user and the players. In one implementation, when number of players accepting the invitation is less than the number of players that were involved in the prior game play of the game, re-creation of the game includes re-creating the game with status of all players that were involved in the prior game play so as to provide a proper perspective of where the prior game play was left off but allowing the user and only those players that accepted the invitation to continue game play of the game from the pause point onward. In an alternate implementation, re-creation of the game includes re-creating the game with game status of only the user and those players that accepted the invitation.

The time window is a block of time of a certain length. In some implementations, the length of time identified in the window may depend on the complexity of the game and amount of time needed to set up the game for game play. For instance, if a game has a lot of set-up routines that needs to be completed prior to game play, the game may require a longer length of time for setting up versus a game that has minimal set-up routines. Similarly, a game that was paused at a very advanced stage (e.g., at level 18 out of 20 levels) may require a longer length of time to set up than a game that was paused at an earlier stage. Thus, depending on the game and where the game was paused, the length of time defining the time window may span from few seconds to few minutes. The game data synchronizer 500, in one implementation, analyzes the prior game play, if available, or game information of the game to determine the type of game and amount of time required to set up the game to define a time window based on the analysis. The time window identified includes sufficient buffer time for the game data synchronizer 500 to set up the game. As the prior game play may be paused at any stage, the length of time defined in the time window may vary. For example, for a game that has 20 levels and the prior game play was paused at level 2, the length of time defined in the time window may be, for example, 1 minute (inclusive of buffer time)—much shorter than the time window of, for example, 3 minutes if the same game was paused at level 18 during prior game play. The time window mentioned herein is provided as an example and should not be considered restrictive. In an alternate implementation, the length of time defined in the window may be pre-defined.

The game data synchronizer 500 begins re-creating the game a length of time defined in the window prior to the scheduled time. The game data synchronizer 500 may synchronize re-creation of the game for game play for the user and all players at the one or more servers in one or more data centers so that the user and the players that accepted the invitation may be able to begin game play of the game as soon as they connect to the cloud gaming system and select the game. The re-creation includes loading game data of the game for all players up to a point where the game is to begin making it appear as though the game was paused during the current game play, whereas in reality the game was reconstructed from prior game play and kept ready in time for the user and the select ones of the players to resume the game. The re-creation of the game just prior to the scheduled time of game play allows the cloud gaming system to use the system and communication resources optimally by allocating such resources just prior to the scheduled time for the user and the select ones of the players to resume game play and not tie up the system resources unnecessarily by keeping the game data loaded from the time it was paused during prior game play till the scheduled time. Further, keeping the game ready at the scheduled time avoids the user and players having to unnecessarily wait for the game to load, thereby enhancing the user and the players game play experience.

Figure 2:
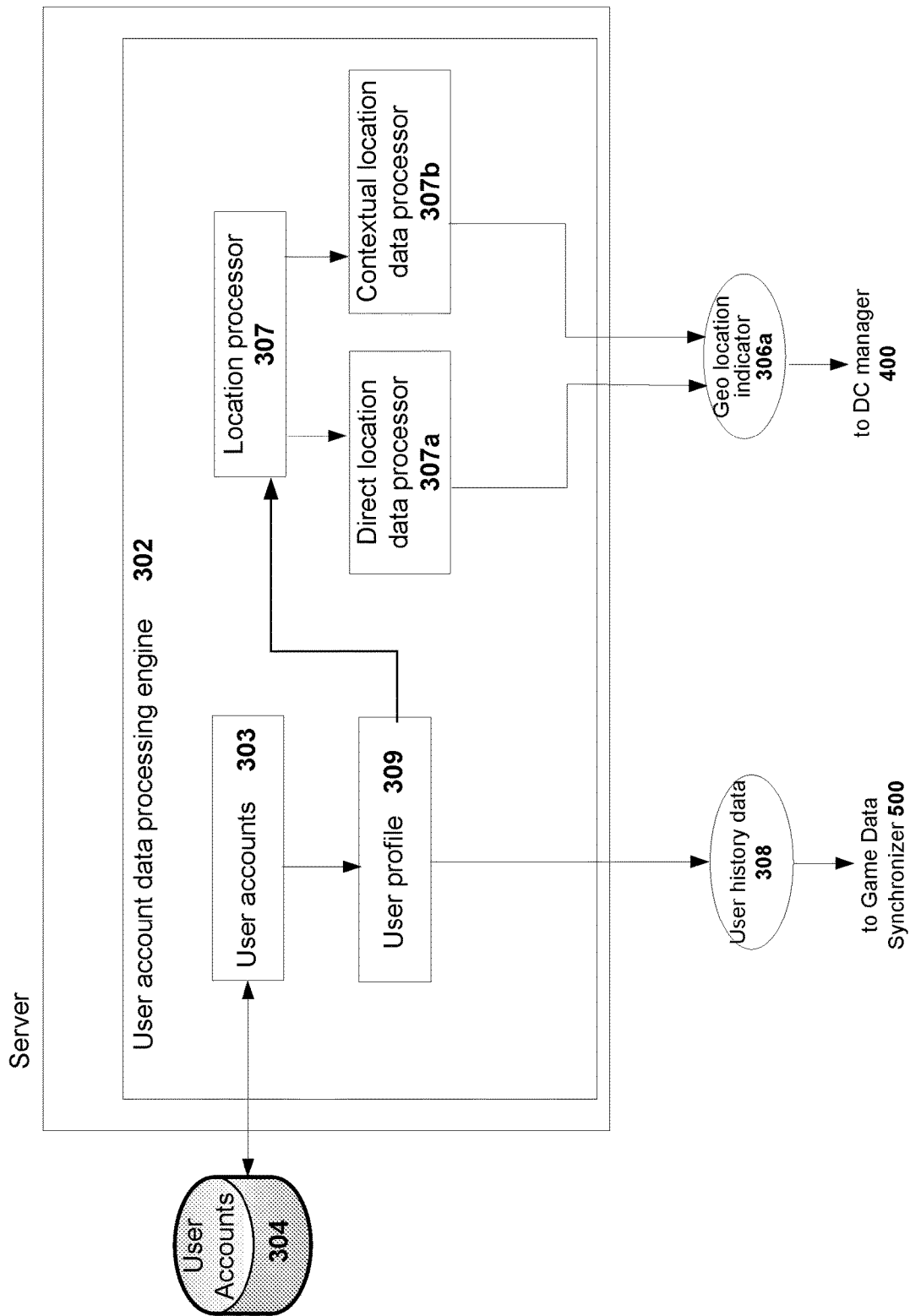
FIG. 2 illustrates an example user account data processing engine within an application hosting system to provide user profile data of a first player and the specific ones of the other players that have agreed for game play of a video game with a first player, at a scheduled time, in accordance with one implementation of the present invention.

FIG. 2 identifies the various modules within a user account data processing engine 302 available within the application server 301 of a cloud hosting system. The cloud hosting system hosts a plurality of applications, including game applications, and is also referred to herein as a "cloud gaming system" 300. When a request for game play of a game at a scheduled time is received from a client device of a user (i.e., a first player), the user account data processing engine 302 is triggered to verify the user initiating the request. The user account data processing engine 302 engages user accounts module 303 to retrieve user account information of the user stored in a user accounts database 304 and use the user account information to verify the user that is initiating the request for game play of the game. The verification of the user includes verifying that the user is a valid user of the cloud gaming system and has access to the game for game play. The user account information will identify the list of applications, such as game applications, that are available for the user account for viewing and for interacting. The user accounts module 303 is also used to retrieve user account of the one or more players identified in the request. For each player (i.e., a user initiating a request or a player responding to the request), the user account provides player-related information including identifier, screen name, icon or avatar, skills, ranking, preference of applications, credentials, and other data (including biometric data) that can be used to distinctly identify the player. The user accounts information is forwarded to a user profile 309. The user profile 309 analyzes the user accounts information of each player to determine the user profile of the player. The user profile of the player includes a geo location associated with the player.

The geo location of the player identified from the user profile 309 is then verified to ensure that the geo location identified in the user profile is indeed the current geo location of the player. The verification may be done using a location processor 307. The location processor 307 may verify the geo location by obtaining a signal generated from a client device of the player that is used to respond to the invitation to join game play of the game. The player may use one client device for responding to the request for game play of the game and another device for the game play. Consequently, determining the player's current geo location would assist in identifying a data center for loading the game in advance of the scheduled time so that the game is ready for game play. The signal may be generated when the player uses a web browser at the client device to interact with a web server, or uses any other client-side application to access a corresponding server-side application (e.g., social media posts to a social media provider, etc.), and this signal may be used to determine the client's IP address, client's ping information, etc. Alternately, the signal may originate from a Global Positioning System (GPS) mechanism within the client device. The signal from the GPS mechanism may be an off-network signal, which can be analyzed to obtain current geo location. The off-network signal is a signal that is generated from the client device without requiring the client device to be connected to the network. The location processor 307 may engage a direct location data processor 307a to interpret the signal generated from the client device to determine the geo location and to verify the current geo location of the player.

In an alternate implementation, the location processor 307 may retrieve data from interactions provided by the player, such as social feeds posted to a social media system server, by making API calls to appropriate servers to which such interactions are being updated. Of course, access to such feeds is available at the appropriate servers based on the permissions granted by the player. The location processor 307 may then engage a contextual location data processor 307b to contextually analyze the social feeds, for example, to determine the geo location of the player. The location processor 307 then verifies the geo location of the player provided in the user profile with the geo location obtained from the signals or feeds to determine the current geo location of the player. Upon verification, the current geo location is provided to a data center manager 400 and may also be used to update the geo location indicator in the user profile of the player. The aforementioned ways to verify the geo location of the player are just examples and other types of mechanisms, tools, logic, or interactions may be used to verify the geo location of the player. It may be determined that more than one player or all of the players and user may have the same geo location.

The user profile information is also used to identify use history of the player, wherein the use history identifies the application(s) that the player interacted with in the cloud gaming system 300, the time and frequency of such interactions, length of the interactions, geo location from where the application(s) were accessed, etc. The use history of the player may be used to determine the player's preferences, player's log-in routines, player's skills, etc. Information obtained from the analysis of the use history can be used during loading of the game for game play, for the player.

Figure 3:
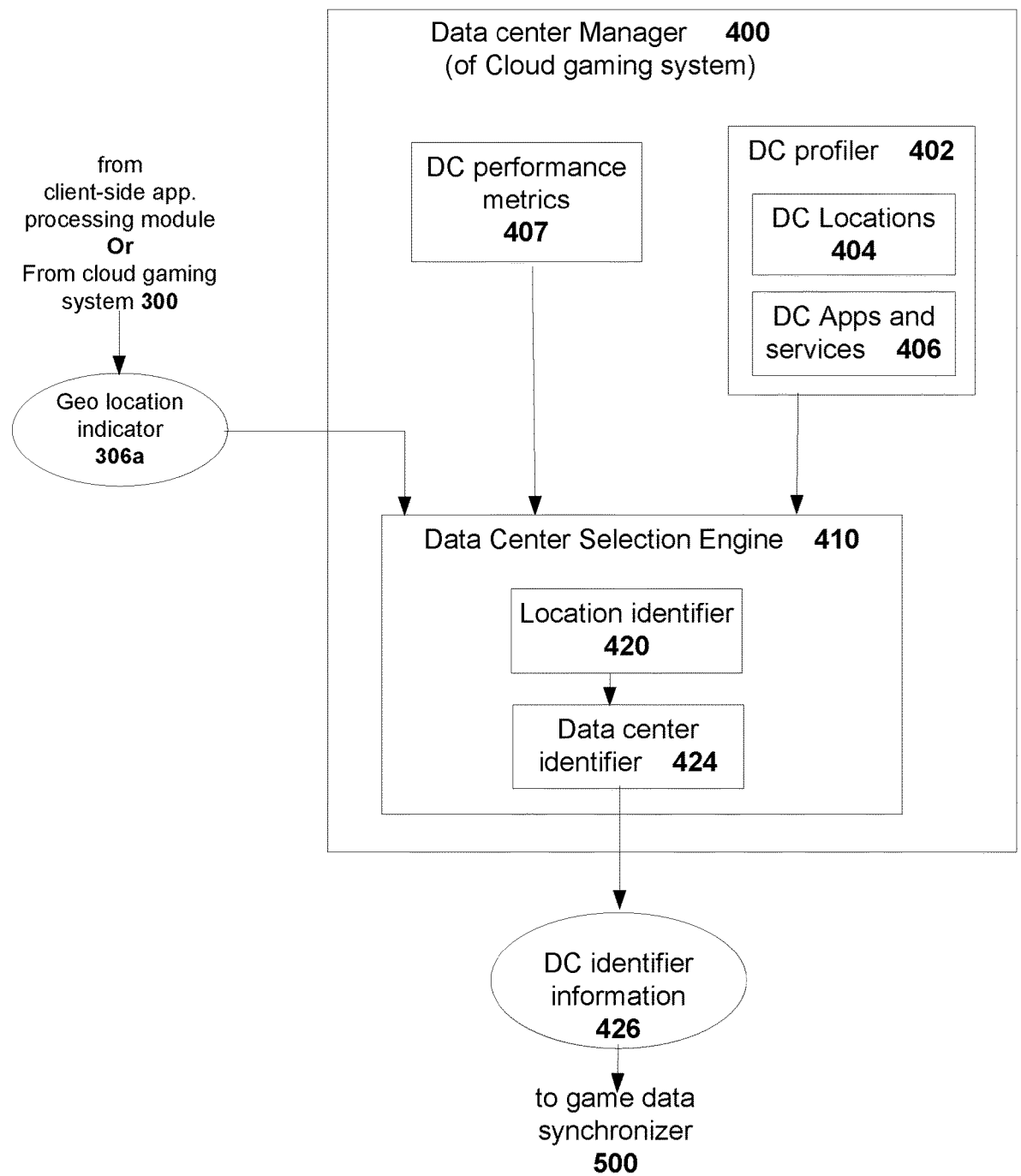
FIG. 3 illustrates an example data center manager module within an application hosting system to identify one or more data centers based on geo location of a first player and specific ones of other players, for migrating game-related data of the video game at the scheduled time, in accordance to an implementation of the invention.

FIG. 3 illustrates the various components within a data center manager 400 of a cloud gaming system 300 that is used to identify a data center for a current geo location of a player, in one implementation. The data center (DC) manager 400 receives geo location indicator 306a and gaming and/or application use history 308 for each player that has agreed to play the game at the scheduled time, from the user account data processing engine 302. The DC manager 400 uses the geo location provided in the geo location indicator 306a to identify an appropriate data center within or in the vicinity of the geo location so that the game data of the game can be loaded on one or more servers within the identified data center for the player. The information provided in the application use history 308 is processed by the DC manager 400 to obtain player's credentials, player's preferences, player's customization, etc., which can be used for setting up the game, in case no prior game play activities are registered for the game between the user and the players identified in the request.

The DC manager 400 engages a DC selection engine 410 to identify a data center that is capable of providing sufficient processing, network and communication resources for transmitting game data during game play of the game at the scheduled time with minimal latency. The DC selection engine 410 includes a plurality of sub-engines (e.g., location identifier 420, DC identifier 424) to receive geo location indicator 306a provided by the user account data processing engine 302 to identify current geo location of a player and to identify a data center for pre-loading game data of the game for game play. In addition to the geo location indicator 306a, the user account data processing engine 302 may also provide use history data information to the DC selection engine 410.

The DC selection engine 410 queries the request to identify the scheduled time identified in the request for game play of the game and use the scheduled time to determine which data center is capable of servicing the game play request for each player. The location identifier 420 in the DC selection engine 410 obtains the geo location indicator 306a and analyzes the information provided therein to identify the geo location that is associated with the player in the player's user profile. This geo location is verified using information provided in the use history data information. The use history data information may include information related to any and all interactions that the player provides while interacting with various applications hosted by the cloud gaming system. In some implementations, the location identifier 420 may obtain a signal from a GPS device within the client device of the player and analyze the signal to determine geo location of the client device, and hence that of the player.

In some implementations, the use history data information may provide details of the web browser interaction of the player, interactions directed toward other application hosted by the cloud gaming system, including other video game applications, interactions that are directed toward an application that is executing on the client device, etc. The information obtained from the player's interaction with one or more of the different applications is analyzed to determine the geo location of the player. In some implementations, the use history data information of the player is analyzed within the time window defined for the scheduled time of game play in order to obtain the latest geo location of the player. It is very likely that the geo location identified for the player from the player's recent interactions with the various applications is the current geo location of the player. The location identifier 420 compares the geo location of the player identified from the player's interactions with other applications with the geo location in the user profile. When the geo location of the player obtained from the interactions or signal is different from the geo location within the user profile of the player, the geo location identified from the interactions with the various applications is the current geo location of the player and the user profile of the player is updated with the current geo location. The location identifier 420 provides the current geo location of the player to the data center (DC) identifier 424 to determine select one or more data centers that are in the current geo location or in the vicinity of the geo location of the player.

The DC identifier 424 interacts with a DC profiler 402 to obtain data center identifiers of data centers that are available within or in the vicinity of the geo location of each player. A DC locations sub-component 404 within the DC profiler 402 is configured to query a list of data centers maintained in a DC data store (not shown) to identify one or more data centers that are within or in the vicinity of the current geo location for each player. The list may be organized by geo location. In response to the query, the DC locations sub-component 404 returns the data center identifiers of select one or more data centers to the DC selection engine 410. A DC Apps and Services sub-component 406 within the DC profiler 402 is configured to obtain a list of servers and consoles available within each of the select one or more data centers returned by the DC profiler 402 and a list of applications (Apps) or services that each server or console within each data center is executing or is capable of executing.

Based on the information provided by the DC profiler 402, the DC identifier 424 identifies a particular data center to use for the geo location for setting up the game for each player. To ensure that the particular data center selected for each player is capable of providing the required communication connection and processing resource bandwidth at the scheduled time, the DC selection engine 410 interacts with a DC performance metrics evaluator 407 to retrieve data center profile of each of the data centers identified by the DC profiler 402 for the geo location of each player. The data center profile identifies each data center's processing and communication attributes.

The DC performance metrics evaluator 407 maintains data center profiles for all the data centers available at the cloud gaming system 300. These profiles are constantly updated as requests for one or more applications or games is serviced by the respective data center, as users exit their game play sessions (or application sessions), and as requests for scheduling one or more games or applications are received. The up-to-date data center metrics defines a current status and resource capabilities of each server in the respective data centers as well as the demand placed on the resources from games or applications that are scheduled to execute at different times. For e.g., the up-to-date data center metrics may identify types and number of game instances of a game (or application instances of applications) that are currently executing or is scheduled to execute at any time, type of processing and/or system resources currently available or are likely to become available at any time, status of each of the processing resources at the different servers in the data center, type of services and applications available at the data center, etc. The DC selection engine 410 uses these data center attributes to select the data center for servicing the request for each player that has accepted the invitation for game play of the game.

The DC identifier 424 in the DC selection engine 410 uses the data center metrics and matches the metrics to performance requirements, system requirements, storage requirements, processing resource requirements, communication connection requirements for communicating game data, etc., expected for the game. For example, performance requirements may be based on game play intensity desired by the user and the players. In another example, the processing and communication requirements may be obtained from game specifications defined by a developer of the game.

The DC identifier 424 receives the user attributes (such as game play intensity, player credentials, etc.), characteristics of the game and data center metrics information and uses this information to identify a data center in the geo location that can meet or exceed the requirements specified for game play of the game. In some implementations, it may be determined that none of the data center in the vicinity of the geo location of a player have all of the resources needed for servicing the game play session of the game, so as to provide a comparable game play experience for the player. In such implementations, the DC identifier 424 may assign a weight for each of the resource requirements specified for the game and use the weighted resource requirements for servicing the request for a player. For example, for a computation intensive game, the processing and storage resources may be weighed more than networking resources. As a result, the DC identifier 424 may identify a data center within the geo location of the player that has sufficient processing and storage resources for servicing the request. In another example, for a speed intensive game, communication connection and network resources may be weighed more than processing and storage resources. Consequently, a data center that has the sufficient communication connection and network resources is identified for processing the request for the player.

Once the data center is identified for the geo location of each player, the data center identifier information 426 is forwarded to the game data synchronizer 500. The game data synchronizer 500 also receives application use history data information 308 for each player from the user account data processing engine 302. The game data synchronizer 500 processes the information and generates a signal to the identified data center to upload game data of the game for the respective player(s) in advance of the scheduled time, so that the game is ready for game play as soon as each of the players or the user login to the cloud gaming system.

The game data synchronizer 500 analyzes the application use history data information 308 for each player of the game to identify the player's game play attributes to identify player's credentials, player's customization, set of routines followed by the player for setting up the game, inputs provided by the player during game play of the game, etc. The player's credentials provide details, such as the player identifier, the game identifier, date, time of day, game type, performance use of the game, skill or expertise level of the player, current geo location of the player, amount of time spent, frequency of access, performance requirement desired for the game, etc.

Figure 4:
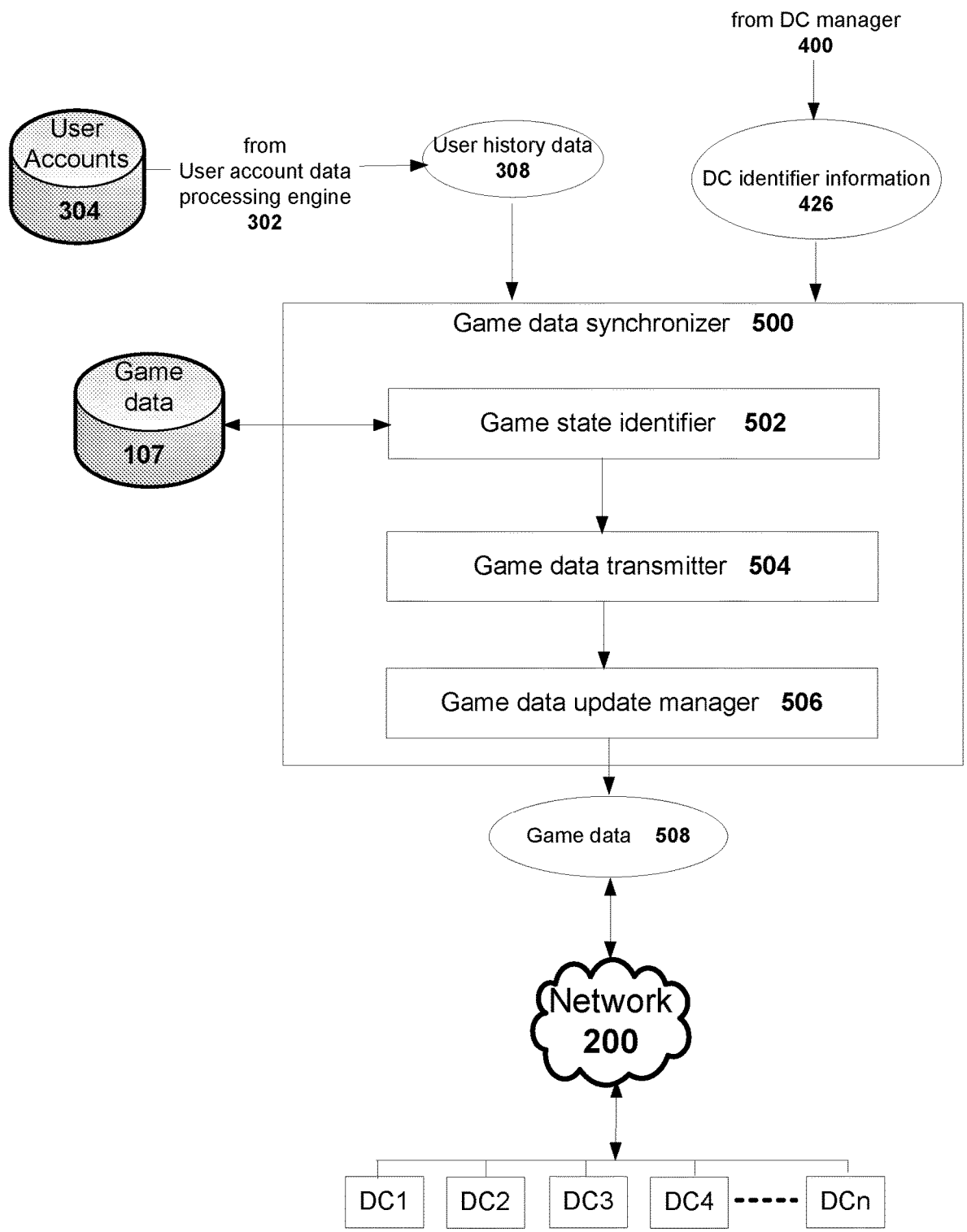
FIG. 4 illustrates an example game data manager module (e.g., game execution engine) within a cloud gaming system to identify the game data of the first player and each of the specific ones of the other players that needs to be pre-loaded, in accordance with an implementation of the invention.

FIG. 4 illustrates the various components of the game data synchronizer 500 used to identify each player's game play related attributes and get the game ready for game play at the scheduled time. A game state identifier 502 within the game data synchronizer 500 queries the game data datastore 107 to identify a game state of the game that is identified in the request for game play between the user and the players, at the scheduled time. The game data datastore 107 maintains game state of various games that were played during prior game play sessions between various players. The game state of the game identifies game status of each player (including the user that initiated the game play request), and other game data that is relevant to re-create the game up to a point where the game play is to begin at the scheduled time. The game status of all players makes up the overall game state of the game. A query to the game data datastore 107 may identify a record defining a game state of the game from prior game play between the user initiating the request and the players that accepted the invitation for game play. In the prior game play session between the user and the players, the game play may have been paused and the current request from the user may be to resume game play of the paused game from a point where it was paused. When the query to the game data datastore 107 returns no record for the game, it means that there was no prior game play between the user and the players registered in the game data datastore 107. In this case, the request for game play at the scheduled time would be to start game play of the game from the beginning.

The game state and other relevant information for re-creating the game is provided to the game data transmitter 504. The game data transmitter 504 processes the game state information from the prior game play transmitted by the game state identifier 502 to identify the game status of each player (i.e., other player or user). Relevant data pertinent to the game status of each player is identified from the game state information and provided to the game data update manager 506.

The game data update manager 506 receives the relevant data for each player, including inputs provided by the player at different times during setting up of the game and during game play and identifies corresponding game data 508 for each player based on the game status of the respective player. The game data update manager 506 obtains a time window from the schedule window 351b to determine the time to begin uploading the game data 508 on one or more servers at respective data centers identified by the DC manager 400. The time window, in one implementation, is a static pre-defined length of time prior to the scheduled time. In another implementation, the time window may be dynamically defined based on one or more of type of game, game state of the game, amount of game data that needs to be uploaded, etc. For example, if the game was paused at level 18 of the game and the game has 20 levels (i.e, game was previously paused at an advanced level), then the time window may be longer than for the same game that was paused at level 2. This might be due to the fact that there will be lot more game data that needs to be uploaded for level 18 (i.e., game data from level 1 to level 18) versus game data that needs to be uploaded for level 2. Similarly, if the game has lot of graphics that need to be uploaded, the time window may be defined to be longer than for a game that has fewer graphics to upload. The time window defined includes amount of time required to upload the game data and, in some implementations, may also include a built-in buffer time to complete loading of the game data 508 for each player. For example, if the scheduled time for game play is defined to be 6:00 p.m. on a Tuesday, and it takes about 15 seconds in length to upload the game data, then the time window may include 15 seconds and about 15 minutes of buffer time for uploading the game data to the servers. Thus, in the above example, the game data update manager 506 may begin pre-loading the game data for each player to servers in respective data centers starting at about 5:44 p.m. on the Tuesday, so that the game is completely loaded and ready for the players and the user to begin game play when the players and the user connect to the cloud gaming system to begin game play. The above buffer time is provided as a mere example and should not be considered limiting.

When the time defined by the time window is reached, the game data update manager 506 establishes a communication connection with the identified data center for each player and sends a signal with relevant game data for the player to the identified data center requesting the data center to automatically upload the game code (if one is not already available in the data center) and the relevant game data for the player on the one or more servers within the identified data center. The one or more servers in the data center receive the game data and execute an instance of the game using the game code. The loading of game data for the player includes the servers automatically providing inputs for various routines during setting up of the game and during game play, wherein the inputs provided by the server mimic the inputs provided by the player during the prior game play of the game. Each player may have his own set of routines that he follows for setting up the game and may provide inputs during game play and such inputs of each player are captured in the game data of the game that is stored in the game data datastore 107 and provided by the game data update manager 506 to the servers so that the servers may use these inputs from each player in pre-loading the game for the player in time to enable game play at the scheduled time.

In some implementations, the player may have not played the game and as a result, the game data datastore 107 may not have any records of the player's inputs. In such implementations, the game data update manager 506 may use the player's customizations, preferences, game skills, interests, inputs provided for various routines during setup of game and during game play, etc., from game play of other games to determine the player's credentials. The player's credentials are provided to the servers in identified data center to be used during pre-loading of the game up to a point where the player and the user are to begin game play of the game. For instance, for a game that does not have a record of game play of the game between the players and the user in the game data datastore 107, the point from which game play is to begin may be the beginning of the game. In this instance, the pre-loading includes loading the game data (e.g., set-up routines, login routines, etc.) for the game up to the beginning of the game so that the players and the user do not have to go through the login routine or set-up routine but can "drop" directly into the game and begin game play.

In another instance, even when the game data datastore has a record of prior game play of the game between the players and the user, the user may initiate a request for game play of the game to begin from the start. In such a case, the game will be pre-loaded up to the beginning of the game and the set of routines, such as log-in routines, set-up routines, etc., for each player are performed with inputs that mimic the respective player's inputs.

The game data update manager 506 synchronizes the pre-loading of the game for the user and all the players that accepted the invitation for game play at the one or more data centers so that the game is ready for game play for all the players and the user at the scheduled time. The pre-loading of the game is done without the user having to provide any other inputs and is done in response to the one or more players accepting the invitation for game play at the scheduled time requested by the user. Further, the pre-loading of the game is done up to a point from where the game play is to begin as defined by the game state of the game stored in the game data datastore 107. There is no need for the players to provide any other input other than to connect to the cloud gaming system to begin game play. The game is set up in accordance to each player's preference and includes the player's customization, etc. The data center at the geo location is chosen such that the server(s) provides minimal latency and provides sufficient processing and communication resources so that the user and the players will have satisfactory game play experience.

In some implementations, the player and the user are allowed to connect to the cloud gaming system to begin game play within a pre-defined threshold period of time from the scheduled time. For example, if the scheduled time is 6:00 p.m. on a given day, the players and the user may be able to connect to the cloud gaming system for beginning game play up to 6:15 p.m. Of course, the above example of the pre-defined threshold period of time is just an example.

If a player is not able to connect to the game play of the game within the pre-defined threshold period of time, the game play may continue without the player. However, the game data synchronizer 500, in one implementation, provides the player with an option to join in the game play at a different time. For example, the user may have initiated a request for game play of the game at a scheduled time and invited about 10 players to join the game play and 8 out of the 10 players accepted the invitation. However, at the scheduled time or within the pre-defined threshold period of time, player 8 who has accepted the invitation was unable to join the game play. The game play would continue with the other 7 players and the user that scheduled the game play. In this example, player 8 may initiate his own request to join the game play of the game and specify a time that is some time after the current time for joining the game. In some implementations, player 8 may be allowed to initiate the request to join the game play of the game while the game play is still on during the scheduled time and while certain conditions (e.g., while still at a certain level, or while still within continue to be met. For example, player 8 may be allowed to initiate the request to join in the game play while the other players are at a level at which the game was resumed or within certain number of levels from which the game was resumed, etc. Upon verifying the request from player 8 complies with the certain conditions, the request may be forwarded to all the players (i.e., 7 players and the user) that have joined in game play of the game at the scheduled time. In response to the player 8's request, any one of the seven players or the user may accept the player 8's request. In response to player 8's request being accepted, the game data synchronizer 500 may identify the current game state of the game and forward the game data up to the current game state to the data center identified for player 8 so that player 8 can connect to the cloud gaming system and join the game play of the game. In this example, player 8's geo location was already established, data center identified and the game data up to a point where game play was to begin was already provided in advance of the scheduled time in anticipation that player 8 would begin game play at or about the scheduled time. However, as player 8 was unable to begin at the scheduled time and the game play has already resumed, the game data synchronizer 500 provides an option for player 8 to join in game play. The game data synchronizer 500 updates the portion of the game play that the player 8 missed during current game play session that began at the scheduled time, at the data center associated with player 8 to enable player 8 to resume game play.

Player interaction during game play of the game at the scheduled time is tracked at one or more data centers and the game state of the game(s) is updated to the game data datastore 107 maintained at the cloud gaming system.

As mentioned earlier, the players that are identified in the request for game play initiated by a user may be social contacts of the user obtained from a social graph associated with a social network or game play contacts of the user. In one implementation, the players identified in the request are identified based on their online activity at the time the request was initiated. For example, the players that are identified in the request may be social contacts or game play contacts who were online at the time the user initiated the request. The players may be online interacting with other applications including other gaming applications. In this example, the request is forwarded to the players while they are online seeking their response to the request.

When the player accesses his user account on the cloud gaming system at the scheduled time, a direct communication connection is established between the client device of the player and the server (or game console) in the data center at the geo location on which the game has been pre-loaded for the player, allowing exchange of game play data between the game server or game console of the identified data center and the client device of the player. During game play of the selected user, a quality-of-service (QoS) evaluator 408 available in the cloud gaming system may monitor the quality of service provided by the assigned data center for each player by testing the service quality provided by the data center to determine if the quality of service meets the required level of service expected for the game. In some implementations, the quality of service testing may be performed at defined periods or may be performed at regular intervals or continuously during the game play. Based on the quality testing, QoS evaluator 408 may send a signal to the DC manager within the cloud gaming system to either keep the assigned data center during game play of the game or to switch to a different data center within the geo location. In some implementations, the quality testing checks for connection speed, for optimal allocation of resources, level of service provided by each of the resources, etc., and such testing is performed with actual game data exchanged between the respective client device and the assigned data center in the geo location from which the game data is being streamed to the client device.

In some implementations, instead of a player initiating a request for scheduling game play of the video game, the request may be initiated from an organizer or a manager that just manages the game play schedule of a specific video game or for a plurality of video games available on a server or developed by a specific developer or for a specific group of players. In this implementation, the organizer may identify the players to invite based on the various players involvement with the particular video game or with different video games or based on user attributes or game play credentials (e.g., game preferences, skill set, level of involvement, frequency of play of a video game, amount of time spent, number of attempts made at each level or to overcome a particular challenge, etc.) associated with each of the players.

Allowing an organizer to schedule game play of a video game provides more control on who is scheduling game play of the video game and avoiding abuse from users. When a user is given the option of scheduling game play of a video game, such option may be abused by malicious users who might purposely schedule a large amount of game plays, thereby overloading the system and overburdening the system resources. Alternately, a user may schedule game play of the video game with multiple players causing the pre-loading of the video game thereby tying up resources of the system. This would be advantageous when the user and/or most of the players that accepted the invitation to join in game play, actually show up for playing the game at the scheduled time. However, when the user and/or the players fail to show up at the scheduled time, the system resources are unnecessarily tied up, wasting resources of the system.

In order to prevent such misuse or abuse, system resources may be protected and appropriate load balancing put in place by providing control of scheduling game play of the video game to only specific players or users. In some implementations, the organizer that schedules the game play may or may not play the video game at the scheduled time. Thus, various controls may be put in place to ensure the players to have satisfying game play experience while continuing to protect and balance system resources from misuse.

Figure 5:
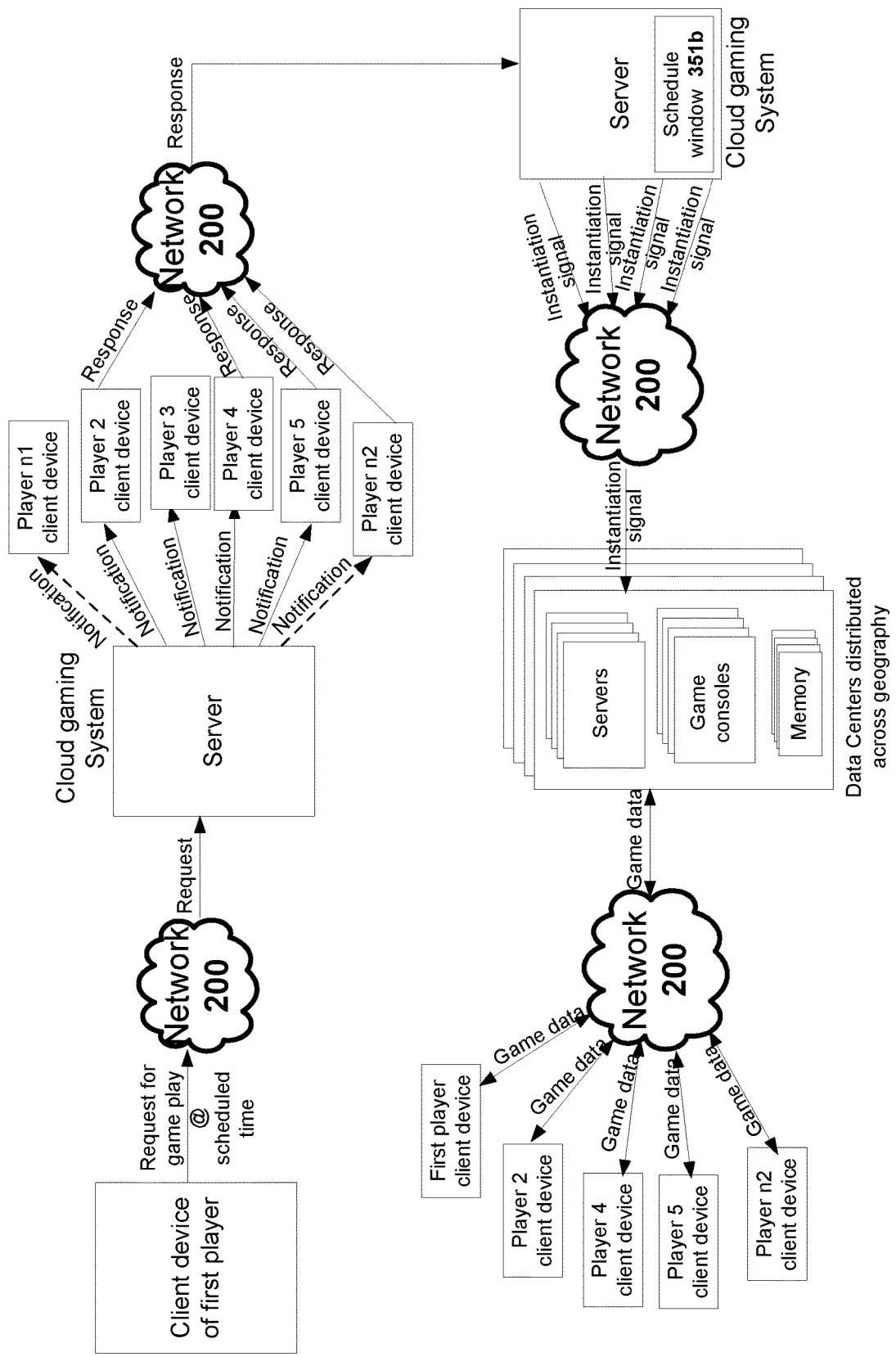
FIG. 5 illustrates a simplified data flow diagram used for pre-loading game data for a video game at a scheduled time, in accordance with an implementation of the invention.

FIG. 5 illustrates a simplified data flow diagram, in one implementation. The data flow begins when a request to play a video game at a scheduled time is initiated from a client device of a first player. The request is forwarded to a server of a cloud gaming system over a network. After verifying the request is valid, the server of the cloud gaming system forwards a notification to client devices associated with a plurality of other players that were identified in the request. In FIG. 5, the other players to whom the notification is sent include Player n1, player 2, player 3, player 4, player 5, player n2. Some of the other players may respond to the notification accepting the invitation to play the game at the scheduled time while others may decline the invitation with explicit action or by not responding to the notification. As shown in FIG. 5, Players 2, 4, 5, and n2 responded to the invitation by accepting the game play request. The responses from the players that accepted the invitation is evaluated by the server of the cloud gaming system. The responses act as authorization for the server to pre-load the game and get the game ready for the scheduled time. The server queries a schedule window 351b to determine a time window before the scheduled time for pre-loading the game and make it available for the players (first player and select ones of the other players that accepted the invitation) to begin game play.

As part of pre-loading the game, the server may determine the geo location of the players that are going to play at the scheduled time, determine the data center(s) in the vicinity of the geo location of the players where the game is to be pre-loaded and sends an instantiation signal to the respective data centers over the network. The instantiation signal includes game identifier, data center identifier, player identifier, prior game play session identifier, etc., to enable the data centers to correctly identify the game data for pre-loading. Based on the geo location of the players, more than one data center may be identified for pre-loading. As a result, each of the identified data centers may be instructed to pre-load the game for specific ones of the players that have accepted the invitation for game play of the game. Since each player's game status may be different, pre-loading the correct game status at appropriate data centers is essential to enable the players to have a satisfactory game play experience. The game is pre-loaded for each player on one or more servers at the corresponding data centers at a time defined in a time window specified by the schedule window 351b, so that the system resources are expended in time for game play and not earlier. The pre-loading is performed synchronously for the players so that the game is pre-loaded up to a point where the prior game play was left off.

When the players (first player, players 2, 4, 5 and n2) access the cloud gaming system, the players are instantaneously dropped into a game stream of game play to make it appear as though the players never left the game. Game data from game play is exchanged between the players' client devices and the servers of the data centers over the network using the communication and system resources of the identified data centers. The implementations described herein provide a way for the first player to gather other players online at a scheduled time to play the video game and the system pre-loads the game data for the specific ones of the players and gets the game ready for game play. Such pre-loading makes optimal use of system resources while ensuring that all the players have a good game play experience. The periodic QOS testing also ensures that the assigned data centers are able to provide sufficient resources to ensure the players are able to interact with minimal latency for a satisfactory game play experience.

Figure 6A:
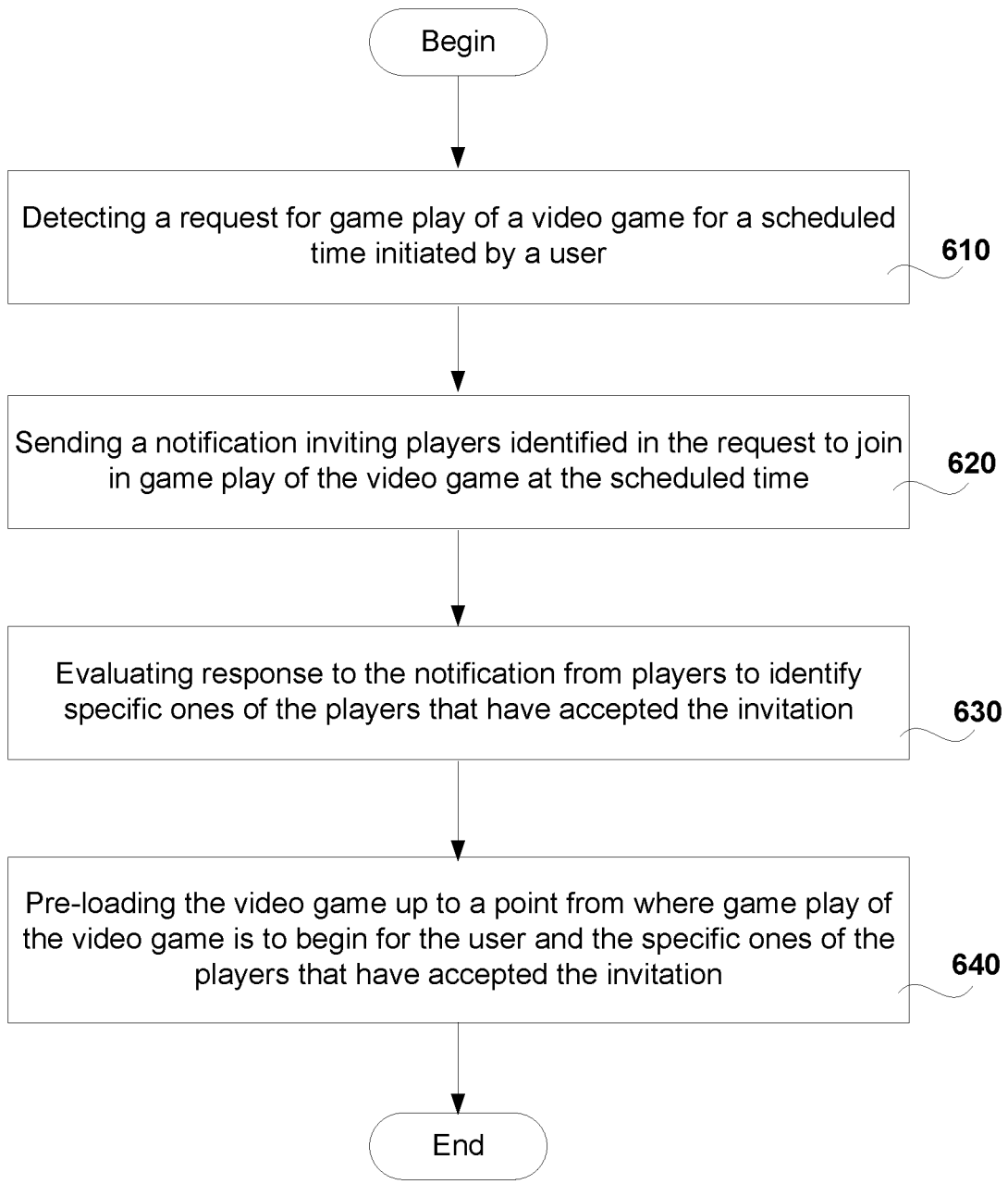
FIG. 6a illustrates process operations of a method that is used to pre-load game data for a video game on to cloud gaming system that is scheduled for game play at a scheduled time, in accordance with an implementation of the invention.

FIG. 6a illustrates the various method operations used for pre-loading a video game in advance to enable game play of the video game at a scheduled time. The method begins at operation 610, when a request for game play of a video game at a scheduled time is detected from a user. The user is a player of the video game that has initiated the request. The request includes an identifier of the video game and identity of a plurality of players that have been invited for game play of the video game at the scheduled time. In response to the request, a notification is sent to the plurality of players identified in the request inviting the players to join in game play of the game, as illustrated in operation 620. One or more of the players identified in the request may respond to the request. Responses to the request received from the players are evaluated at the cloud gaming system, as illustrated in operation 630. Some of the players may accept the invitation and some other players may decline the invitation. When the cloud gaming system detects that some of the players have accepted the invitation for game play, the cloud gaming system begins to pre-load the video game in advance, as illustrated in operation 640. The pre-loading may be done up to a point from where game play is to begin. For example, for the video game that was paused during prior game play, the point may be defined to be where the game was paused. For the video game that was not played before the point from which the game play is to begin is from the beginning. In some implementations, even when the video game that was paused during prior game play, based on the user's request, the point to begin game play at the scheduled time might be from the beginning.

Figure 6B:
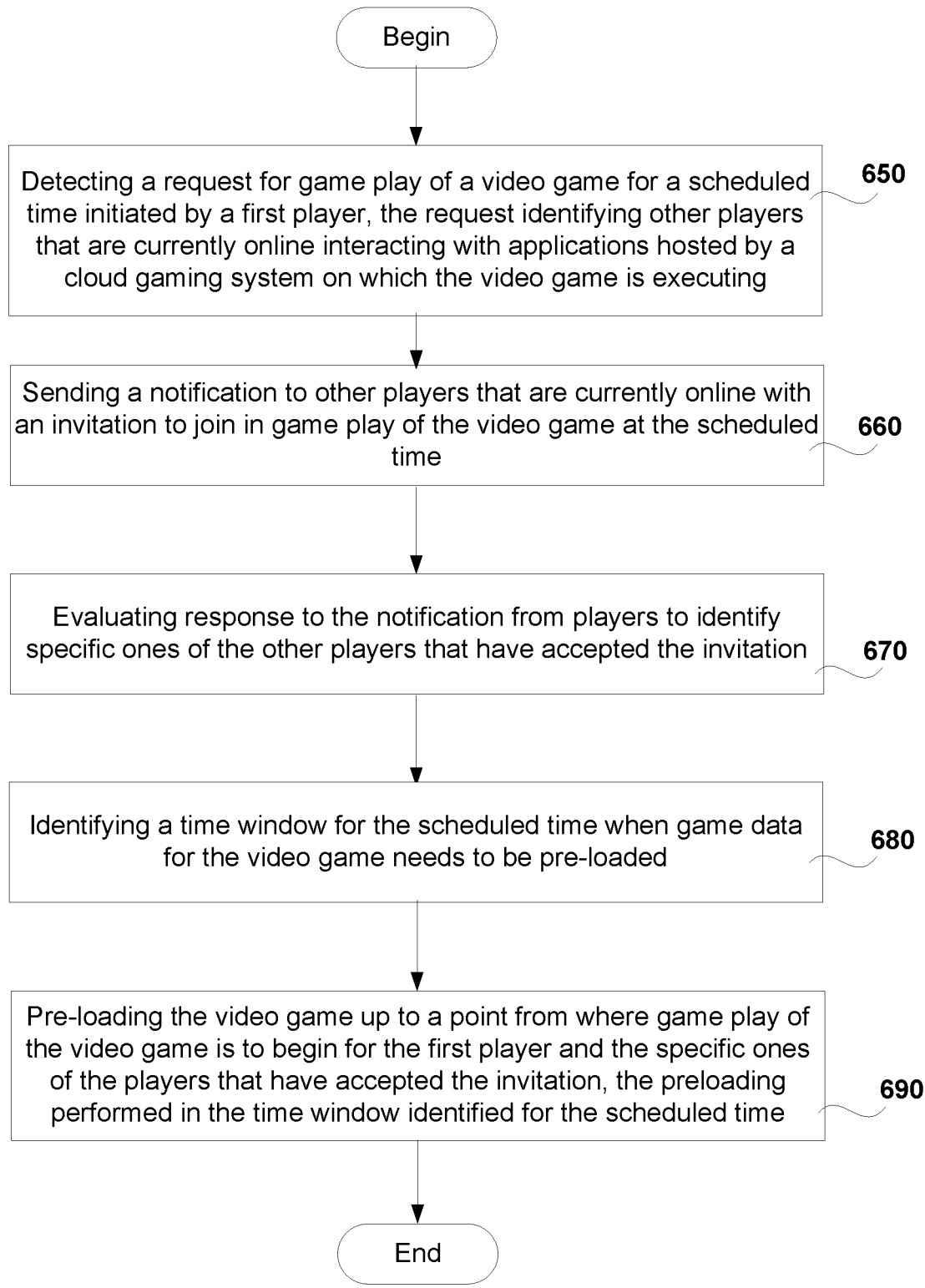
FIG. 6b illustrates process operations of a method that is used to pre-load game data for a video game on to cloud gaming system that is scheduled for game play at a scheduled time, in accordance with an alternate implementation of the invention.

FIG. 6b illustrates the various method operations used for pre-loading a video game in advance to enable game play of the video game at a scheduled time, in an alternate implementation. The method begins at operation 650, when a request for game play of a video game for a scheduled time is detected from a first player. The request is initiated by the first player and includes an identifier of the video game and identity of the other players that are currently online interacting with applications hosted by a cloud gaming system on which the video game is executing. The other players that are identified may be currently involved in game play of the video game with the first player and the first player may be trying to organize a next game play session with the other players that he is currently playing the video game. Alternately, the other players may be identified based on the other players playing the video game amongst themselves and the first player wishes to join in the game play of the video game with the other players. In some other implementations, the other players may be identified based on their current involvement with another application on the cloud gaming system or may be based on prior interaction with another application but are currently online.

In response to the request, a notification is sent to the other players that are currently online with an invitation to join in game play of the game, as illustrated in operation 660. One or more of the players identified in the request may respond to the request. Responses to the request received from the players are evaluated at the cloud gaming system, as illustrated in operation 670. Some of the players that are currently online may accept the invitation and some other players may decline the invitation. When the cloud gaming system detects that some of the players have accepted the invitation for game play, the cloud gaming system determines a time window for the scheduled time when game data for the video game needs to be pre-loaded, as illustrated in operation 680. In some implementation, the time window may be determined dynamically based on the complexity of the game and based on how much game data needs to be pre-loaded in order to enable the first player and the other players to begin game play. In other implementations, the time window may be a static value that is pre-defined for the video game.

The cloud gaming system identifies one or more servers in one or more data centers and sends out a signal to the data centers instructing the data centers to begin pre-loading the video game starting in the time window defined for the scheduled time, as illustrated in operation 690. The pre-loading is done up to a point from where game play is to begin, wherein the point may be where the game was previously paused or may be a starting point or may be a point defined by the first player in the request. The pre-loading of the video game is completed in time for the first player and the specific ones of the other players to access the cloud gaming system and resume game play of the video game from the point defined in the request.

The various implementations discussed herein provide a way to pre-load a game prior to when the user and the players access the game for game play. The pre-loading of the video game allows the players and the user to instantaneously begin game play of the video game without having to wait for the game to load up to the point from where the game is to resume. Further, the pre-loading of the video game for each player (including the user that initiated the request) is specific for the player as the system identifies and provides the inputs for the various routines that mimics the inputs provided by the respective player when the respective player set up the game for game play. The inputs provided by the player may include the game customizations, game preferences, etc., desired by the player and may be based on player's skill level, credentials, familiarity of the game, etc. The sending of the notification, evaluation of the responses from the players and pre-loading of the video game for the user are done by the cloud gaming system automatically in response to detecting a request for game play of the game by the user and does not require further input from the user during these operations. Similarly, the pre-loading of the game for each player is performed automatically by the system in response to the player accepting the invitation and does not require additional input from the respective player. Performing the pre-loading just prior to the scheduled time allows the cloud gaming system to preserve processing and communication resources at times when the game is not being played and expending the system resources only at the time when the game play is scheduled, making this a more efficient way of allocating resources of the cloud gaming system while enabling immediate access to the game for game play. Other advantages will become obvious to one skilled in the art after reading the various implementations.

Figure 7:
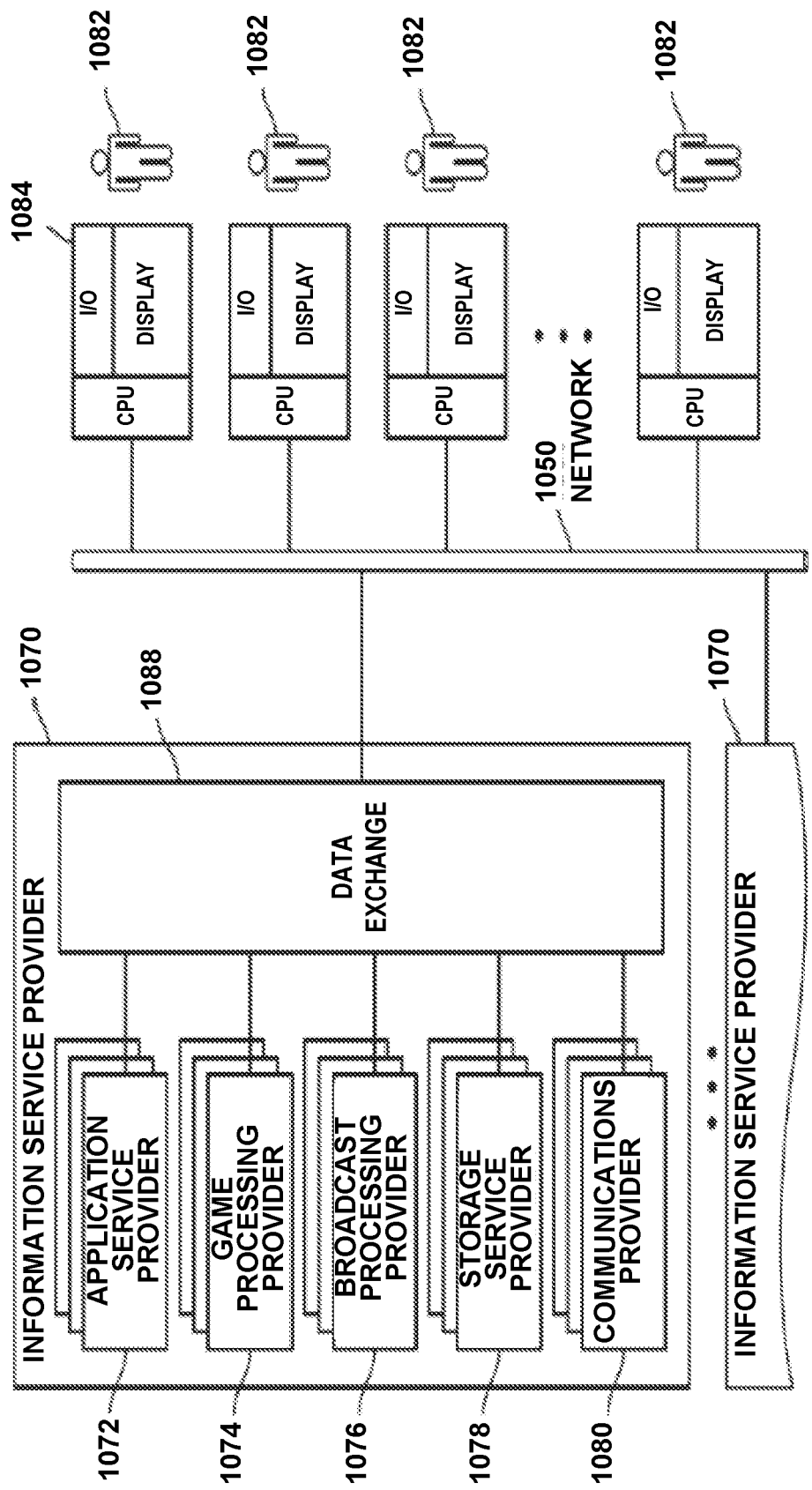
FIG. 7 illustrates an exemplary Information Service Provider architecture for delivering informational content and services to users who are geographically dispersed and connected via network, in accordance with one implementation of the present invention.

FIG. 7 illustrates an implementation of an Information Service Provider architecture that may be used in providing access to different games. Information Service Providers (ISP) 1070 deliver a multitude of information services to users 1082 geographically dispersed and connected via network 1086. Although the various implementations have been discussed with reference to providing fast access to games, the implementations can be extended to provide one or more types of other services. For example, an ISP can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another implementation, a master-server relationship may be established between a master ISP, which manages the information for the user, and a server ISP that interfaces directly with the user under control from the master ISP. In another implementation, the data is transferred from one ISP to another ISP (i.e., during switching of data center assigned to the user) as the client moves around the world and such transfer may be based on a compatibility of services provided by the respective ISPs to make the ISP 1070 in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GaPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another implementation, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one implementation, ISP 1070 recognizes the type of device used by the client and adjusts the communication method employed. In other cases, client devices use a standard communications method, such as HTML, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present implementations are to be considered as illustrative and not restrictive, and the invention is not to be limited to the details given herein, but may be modified within the scope and equivalents of the described implementations.

An exemplary overall system architecture of a gaming console is described herein. An example gaming console may include a Sony® Playstation 3® (PS3) or a Playstation 4® (PS4) entertainment device, which may be compatible with controllers for implementing an embodiment of the present invention. Although the PS3 gaming console system architecture is explained in detail, it should be noted that the various implementations described herein can be extended to system architecture of a different gaming console or computing device. A system unit is provided, with various peripheral devices connectable to the system unit. The system unit is similar to the cloud gaming system 300 of FIG. 1. The system unit comprises: a processor, which may be a 8 core processor, as in PS3, or a multi-core processor, as in PS4; a Rambus® dynamic random access memory (XDRAM) unit, as in PS3, or a graphics dynamic random access memory, such as a GDDR5, as in PS4; a Reality Synthesizer graphics unit (e.g., 550 MHz GPU) with a dedicated video random access memory (VRAM) unit, as in PS3, or 800 or 900 MHz GPU with shared graphics memory in PS4 and PS4 Pro; and an I/O bridge. The system unit also comprises a Blu Ray® Disk Read Only Memory (BD-ROW)) (optical) disk reader for reading from a disk and a removable slot-in hard disk drive (HDD), accessible through the I/O bridge. Optionally the system unit also comprises a memory card reader for reading compact flash memory cards, Memory Stick® memory cards and the like, which is similarly accessible through the I/O bridge and in PS4, a built-in DVR to record games.

The I/O bridge also connects to six Universal Serial Bus (USB) 2.0 ports; a gigabit Ethernet port; an IEEE 802.11b/g wireless network (Wi-Fi) port; and a Bluetooth® wireless link port capable of supporting of up to seven Bluetooth connections.

In operation the I/O bridge handles all wireless, USB and Ethernet data, including data from one or more game controllers (DualShock 3 controller, as in PS3, or a PS4 DualShock 4 controller, as in PS4, etc.). For example when a user is playing a game, the I/O bridge receives data from the game controller via a Bluetooth link and directs it to the processor (in PS3) or multi-core processor (in PS4), which updates the current state of the game accordingly. Further, other image and move sensors provide data captured during game play of the user, to the I/O bridge, which directs it to the respective processor. The game controllers (e.g., game controllers of PS4) include a share button option for sharing a game, a clickable touchpad, a rechargeable battery (lithium-ion or other type), etc.

The wireless, USB and Ethernet ports also provide connectivity for other peripheral devices in addition to game controllers, such as: a remote control; a keyboard; a mouse; a portable entertainment device such as a Sony Playstation Portable® entertainment device; a video camera such as an EyeToy® video camera; a microphone headset; and a removable hard drive. Such peripheral devices may therefore in principle be connected to the system unit wirelessly; for example the portable entertainment device may communicate via a Wi-Fi ad-hoc connection, whilst the microphone headset may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader may be connected to the system unit via a USB port, enabling the reading of memory cards of the kind used by the Playstation® or Playstation 2® devices.

In the present implementation, the game controller is operable to communicate wirelessly with the system unit via the Bluetooth link. However, the game controller can instead be connected to a USB port, thereby also providing power by which to charge the battery of the game controller. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control is also operable to communicate wirelessly with the system unit via a Bluetooth link. The remote control comprises controls suitable for the operation of the Blu Ray™ Disk BD-ROM reader and for the navigation of disk content.

The Blu Ray™ Disk BD-ROM reader is operable to read Compact Disc, read only memory (CD-ROMs) compatible with the Playstation and PlayStation 2 devices, in addition to conventional pre-recorded and recordable compact discs (CDs), and so-called Super Audio CDs. The Blu Ray™ Disk BD-ROM reader is also operable to read Digital versatile disc-read only memory (DVD-ROMs) compatible with the Playstation 2™ and PlayStation 3™ devices, in addition to conventional pre-recorded and recordable DVDs. The Blu Ray™ Disk BD-ROM reader is further operable to read BD-ROMs compatible with the Playstation 3 device, as well as conventional pre-recorded and recordable Blu-Ray Disks.

The system unit is operable to supply audio and video, either generated or decoded by the Playstation 3 or Playstation 4 device via the Reality Synthesizer graphics unit, through audio and video connectors to a display and sound output device such as a monitor or television set having a display and one or more loudspeakers. The audio connectors may include conventional analogue and digital outputs whilst the video connectors may variously include component video, S-video, composite video and one or more High Definition Multimedia Interface (HDMI) outputs. Consequently, video output may be in formats such as PAL or NTSC, or in 720p, 1080i or 1080p high definition and 4K, HDR.

Audio processing (generation, decoding and so on) is performed by the Processor. For example, the Playstation 3 device's operating system supports Dolby® 5.1 surround sound, Dolby® Theatre Surround (DTS), and the decoding of 7.1 surround sound from Blu-Ray® disks.

In the present implementation, the video camera includes a CMOS (Complementary Metal Oxide Semiconductor) image sensor (although a charge-coupled device (CCD) image sensor may also be used), an LED indicator, and hardware-based real-time data compression and encoding apparatus so that compressed video data may be transmitted in an appropriate format such as an intra-image based MPEG (motion picture expert group) standard for decoding by the system unit. The camera LED indicator is arranged to illuminate in response to appropriate control data from the system unit, for example to signify adverse lighting conditions. Implementations of the video camera may variously connect to the system unit via a USB, Bluetooth or Wi-Fi communication port. Implementations of the video camera may include one or more associated microphones and also be capable of transmitting audio data. In implementations of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit, an appropriate piece of software such as a device driver should be provided. Device driver technology is well-known and will not be described in detail here, except to say that the skilled man will be aware that a device driver or similar software interface may be required in the present implementation described.

The processor has an architecture comprising four basic components: external input and output structures comprising a memory controller and a dual bus interface controller; a main processor referred to as the Power Processing Element; eight co-processors referred to as Synergistic Processing Elements (SPEs); and a circular data bus connecting the above components referred to as the Element Interconnect Bus. The total floating point performance of the Processor is 218 GFLOPS, compared with the 6.2 GFLOPs of the Playstation 2 device's Emotion Engine.

The Power Processing Element (PPE) is based upon a two-way simultaneous multithreading Power compliant PowerPC core (PPU) running with an internal clock of 3.2 GHz. It comprises a 512 kB level 2 (L2) cache and a 32 kB level 1 (L1) cache. The PPE is capable of eight single position operations per clock cycle, translating to 25.6 GFLOPs at 3.2 GHz. The primary role of the PPE is to act as a controller for the Synergistic Processing Elements, which handle most of the computational workload. In operation the PPE maintains a job queue, scheduling jobs for the Synergistic Processing Elements and monitoring their progress. Consequently each Synergistic Processing Element runs a kernel whose role is to fetch a job, execute it and synchronized with the PPE.

Each Synergistic Processing Element (SPE) comprises a respective Synergistic Processing Unit (SPU), and a respective Memory Flow Controller (MFC) comprising in turn a respective Dynamic Memory Access Controller (DMAC), a respective Memory Management Unit (MMU) and a bus interface (not shown). Each SPU is a RISC processor clocked at 3.2 GHz and comprising 256 kB local RAM, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU does not directly access the system memory XDRAM 1426; the 64-bit addresses formed by the SPU are passed to the MFC which instructs its DMA controller to access memory via the Element Interconnect Bus and the memory controller.

The Element Interconnect Bus (EIB) is a logically circular communication bus internal to the Processor which connects the above processor elements, namely the PPE, the memory controller, the dual bus interface and the 8 SPEs, totaling 12 participants. Participants can simultaneously read and write to the bus at a rate of 8 bytes per clock cycle. As noted previously, each SPE comprises a DMAC for scheduling longer read or write sequences. The EIB comprises four channels, two each n clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz (giga hertz).

The memory controller comprises an XDRAM interface, developed by Rambus Incorporated. The memory controller interfaces with the Rambus XDRAM 1426 with a theoretical peak bandwidth of 25.6 GB/s.

The dual bus interface comprises a Rambus FlexIO® system interface. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Processor and the I/O Bridge via controller and the Reality Synthesizer graphics unit via controller.

Data sent by the Processor to the Reality Synthesizer graphics unit will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's experience. For example, computer generated costumes can be inserted over the user's clothing, and computer generated light sources can be utilized to project virtual shadows within a video scene. Hence, using the embodiments of the present invention and a depth camera, users can experience an interactive environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, such as solid state drives (SSDs), hard disk drives (HDDs), digital video disc (DVD) drives, Bluray®, etc., network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for game play of a video game available on a cloud gaming system, comprising:

detecting a request for game play of the video game at a scheduled time, the request identifying players that are to be invited to join in game play of the video game, wherein the video game is a multi-player video game played between the players to define a current game state;

sending a notification to the players with an invitation to join in game play of the video game at or before the scheduled time, in response to detection of the request;

evaluating response to the notification received from one or more of the players to identify specific ones of the players that have accepted the invitation for game play of the video game at the scheduled time; and pre-loading the video game on one or more servers of the cloud gaming system, up to a point defined by the current game state from where game play of the video game is to begin, for the specific ones of the players that have accepted the invitation for game play, the pre-loading performed automatically without user input, before the scheduled time,
wherein the players identified in the request are players that were involved in game play of the video game during a prior game play session.

2. The method of claim 1, wherein the request is initiated by a player or a game organizer.

3. A method for game play of a video game available on a cloud gaming system, comprising:
detecting a request for game play of the video game at a scheduled time, the request identifying players that are to be invited to join in game play of the video game, wherein the video game is a multi-player video game played between the players to define a current game state;
sending a notification to the players with an invitation to join in game play of the video game at or before the scheduled time, in response to detection of the request;
evaluating response to the notification received from one or more of the players to identify specific ones of the players that have accepted the invitation for game play of the video game at the scheduled time; and
pre-loading the video game on one or more servers of the cloud gaming system, up to a point defined by the current game state from where game play of the video game is to begin, for the specific ones of the players that have accepted the invitation for game play, the pre-loading performed automatically without user input, before the scheduled time,
wherein the response received from a player includes an authorization for the cloud gaming system to begin pre-loading the video game for game play for the player at a server of the one or more servers of the cloud gaming system to enable the player to begin game play of the video game at or before the scheduled time.

4. The method of claim 3, wherein pre-loading the video game includes,
identifying a geo location of the player;
evaluating one or more data centers in a vicinity of the geo location of the player to identify the server within a data center with resources required to service a game play session of the video game, wherein the server is one of the one or more servers of the cloud gaming system; and
pre-loading the video game onto the server of the data center identified in the vicinity of the geo location associated with the player.

5. The method of claim 4, wherein the geo location of the player is identified by querying a user profile of the player.

6. The method of claim 4, wherein the geo location of the player is identified by,
examining online activity of the player to identify a current geo location of the player, the current geo location being used as the geo location of the player for identifying the data center for pre-loading the video game.

7. The method of claim 6, wherein when the current geo location of the player is different from the geo location identified in the user profile, updating the user profile of the player with the current geo location.

8. The method of claim 4, further includes,
establishing a direct communication connection between a client device of the player and the server in the geo location associated with the player to which the video game has been pre-loaded, to allow the player to begin game play of the video game from the current game state, at or before the scheduled time, wherein the direct communication connection is established in response to the player accessing a user account of the player on the cloud gaming system.

9. The method of claim 4, wherein the evaluating of the one or more data centers further includes,
assigning a weight to each resource requirement specified for the video game; and
identifying the data center using the weighted resource requirements for servicing the game play session of the video game.

10. The method of claim 4, wherein the pre-loading of the video game for the player performed by the server at the geo location further includes,
retrieving a set of routines followed by the player during setting up of the video game, the set of routines retrieved from game data generated during a previous session of game play of the video game;
retrieving inputs provided by the player for each routine of the set of routines during set up and during execution of the video game up to the point during the previous session; and
instantiating the video game at the server for a current game session, the instantiating includes executing the set of routines followed by the player and automatically providing the inputs for each routine of the set of routines and during execution of the video game up to the point, the pre-loading of the video game causing game data of the video game to be updated up to the point from where the game play is to begin to enable the player to resume game play from the point.

11. The method of claim 10, wherein the set of routines and inputs are specific for the player, the set of routines and inputs provide information to identify credentials of the player, game customization provided by the player, inputs provided by the player during each routine in the set of routines and game status of the player, and wherein the player is any one of the players that accepted the invitation to join in game play of the video game at or before the scheduled time.

12. The method of claim 1, wherein pre-loading of the video game further includes,
synchronizing the pre-loading of the video game on the one or more servers within one or more data centers corresponding to geo locations of specific ones of the players that responded to the notification,
wherein the synchronizing allowing each of the players to instantaneously begin game play of the video game from the point defined by the current game state, at or before the scheduled time.

13. The method of claim 3, wherein the players are players that were involved in game play of the video game during a prior game play session.

14. The method of claim 1, wherein the pre-loading is performed in a time window defined before the scheduled time.

15. The method of claim 14, wherein the time window includes amount of time required to upload game data of the video game and a buffer time to complete loading of the game data.

16. A method for game play of a video game available on a cloud gaming system, comprising:
sending a notification to players with an invitation to join in game play of a video game at or before a scheduled time, in response to a request for game play of the video game at the scheduled time received at the cloud gaming system, wherein the video game is a multi-player video game;

evaluating response to the notification received from one or more of the players to identify specific ones of the players that have accepted the invitation for game play of the video game at the scheduled time; and pre-loading the video game on one or more servers of the cloud gaming system, up to a point defined by a current game state from where game play of the video game is to begin, for the specific ones of the players that have accepted the invitation for game play, the pre-loading performed automatically without user input, in a time window defined before the scheduled time, wherein the pre-loading of the video game includes,
- synchronizing the pre-loading of the video game on the one or more servers within one or more data centers corresponding to geo locations of specific ones of the players that responded to the notification,
- wherein the synchronizing allowing each of the players to instantaneously begin game play of the video game from the point defined by the current game state, at or before the scheduled time.

* * * * *